United States Patent
Heisler

[15] 3,675,305
[45] July 11, 1972

[54] METHOD AND APPARATUS FOR APPLYING PLASTIC GRIPS TO WIRE BAIL HANDLES

[72] Inventor: Raymond A. Heisler, 657 Dakota Trail, Franklin Lakes Township, N.J. 07417

[22] Filed: Jan. 19, 1971

[21] Appl. No.: 107,622

Related U.S. Application Data

[63] Continuation-in-part of Ser. No. 825,800, May 19, 1969, abandoned.

[52] U.S. Cl. ..............................29/439, 29/208 B, 29/208 C, 29/241, 140/75, 140/93 B
[51] Int. Cl. ....................................B23p 11/00, B23p 19/04
[58] Field of Search....................29/439, 208 C, 208 B, 433, 29/234, 241, 423; 140/75, 93 B

[56] References Cited

UNITED STATES PATENTS

| | | | |
|---|---|---|---|
| 3,123,906 | 3/1964 | Frink | 29/241 X |
| 3,241,578 | 3/1966 | Heisler | 140/93 B |
| 3,444,905 | 5/1969 | Heisler | 140/75 |
| 3,462,823 | 8/1969 | Heisler | 29/208 B |

*Primary Examiner*—Thomas H. Eager
*Attorney*—Ralph R. Roberts

[57] ABSTRACT

A method and apparatus for applying plastic grips to wire bail handles. This apparatus is used in combination with a wire bail-forming mechanism which feeds, cuts and forms wire into a wire bail for attachment to an eared container. The bail-forming apparatus has upper and lower dies which have their midportions contoured to receive and retain cut length of plastic tubing as a length of wire is inserted therethrough after which it is bent into a generally U-shaped bail. A grip transfer arm is mounted on the bail-forming mechanism and at its initial tubing-receiving limit of movement receives an advancing end of a length of tubing and as the arm is moved to its tube-delivering limit of movement the tubing is cut and then positioned in way of the advancing wire used to make the bail handle. The tubing advance mechanism has a check mechanism disposed to engage the tubing so as to permit only a forward movement of the tubing. This advance mechanism includes a movable gripping mechanism disposed to grip the tubing when moved to provide the advancing motion and to slide on the tubing when moved counterflow to the advancing motion. The delivery arm has means for cutting the length of tubing advanced into the desired length and a tubing retaining means for retaining and positioning the tubing as it is received and moved toward and into the dies of the bail-forming apparatus.

30 Claims, 37 Drawing Figures

Fig_1

INVENTOR.
RAYMOND A. HEISLER
BY
Ralph C. Roberts
AGENT.

INVENTOR.
RAYMOND A. HEISLER
BY
Ralph R. Roberts
AGENT.

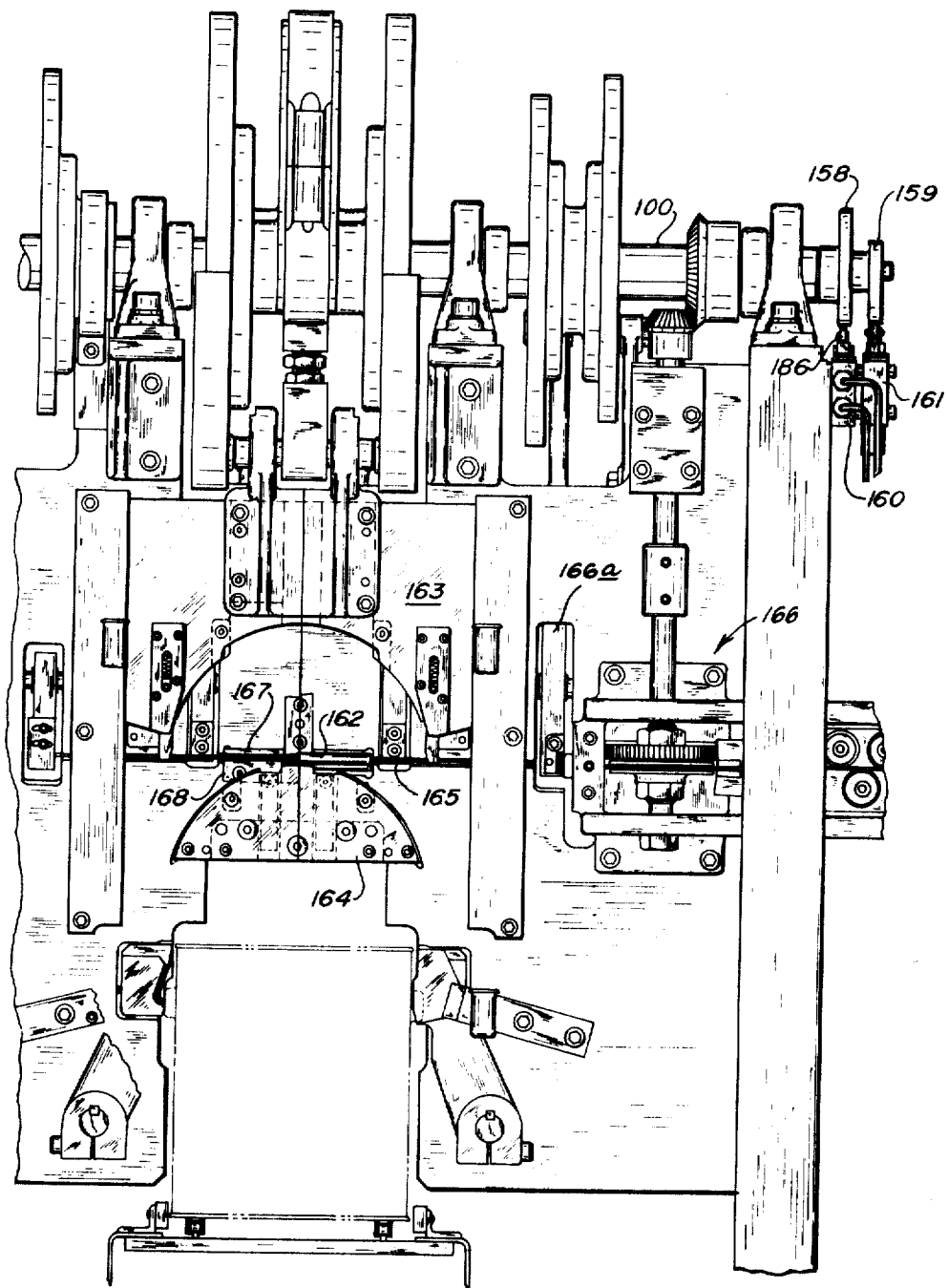

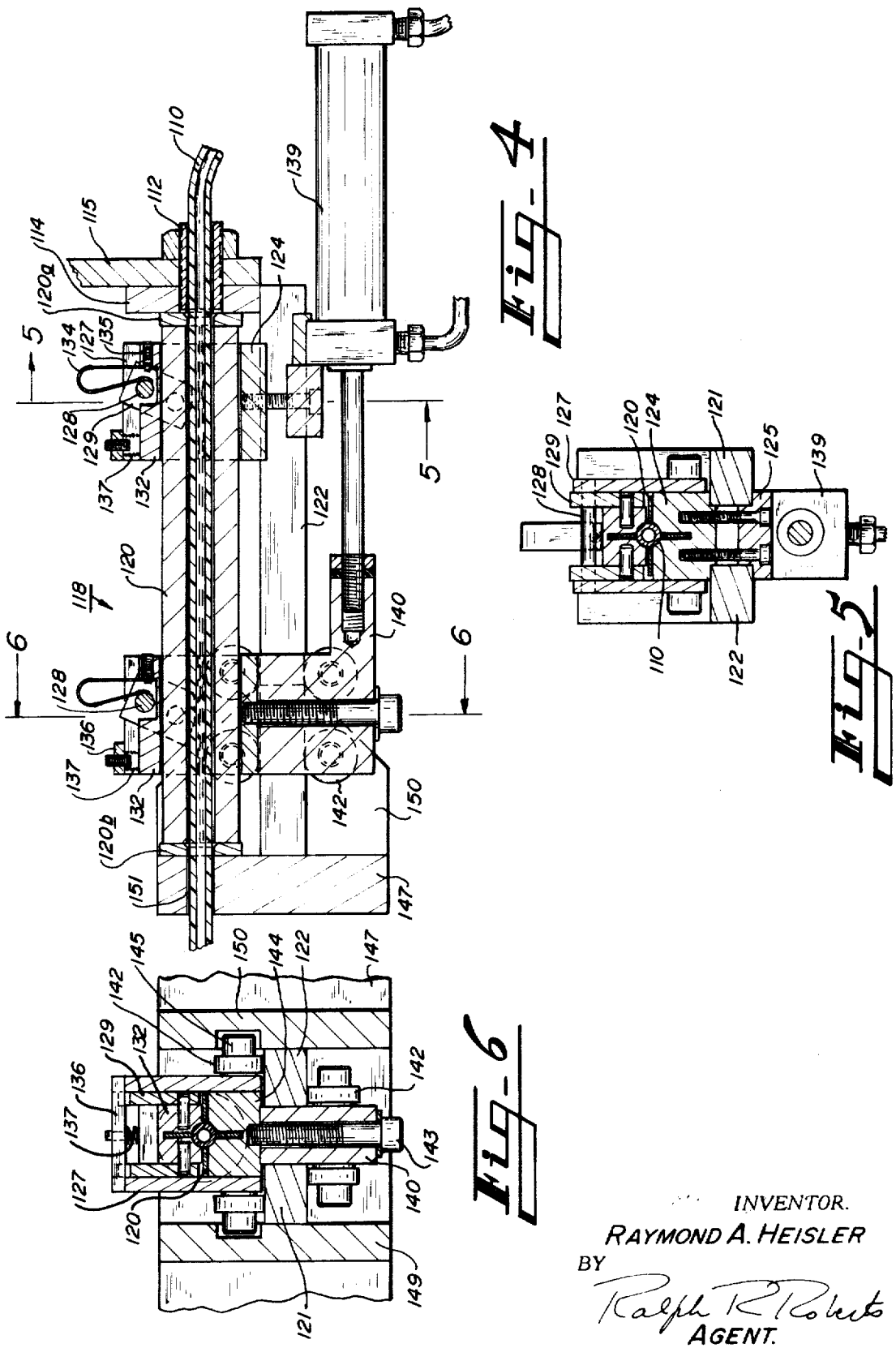

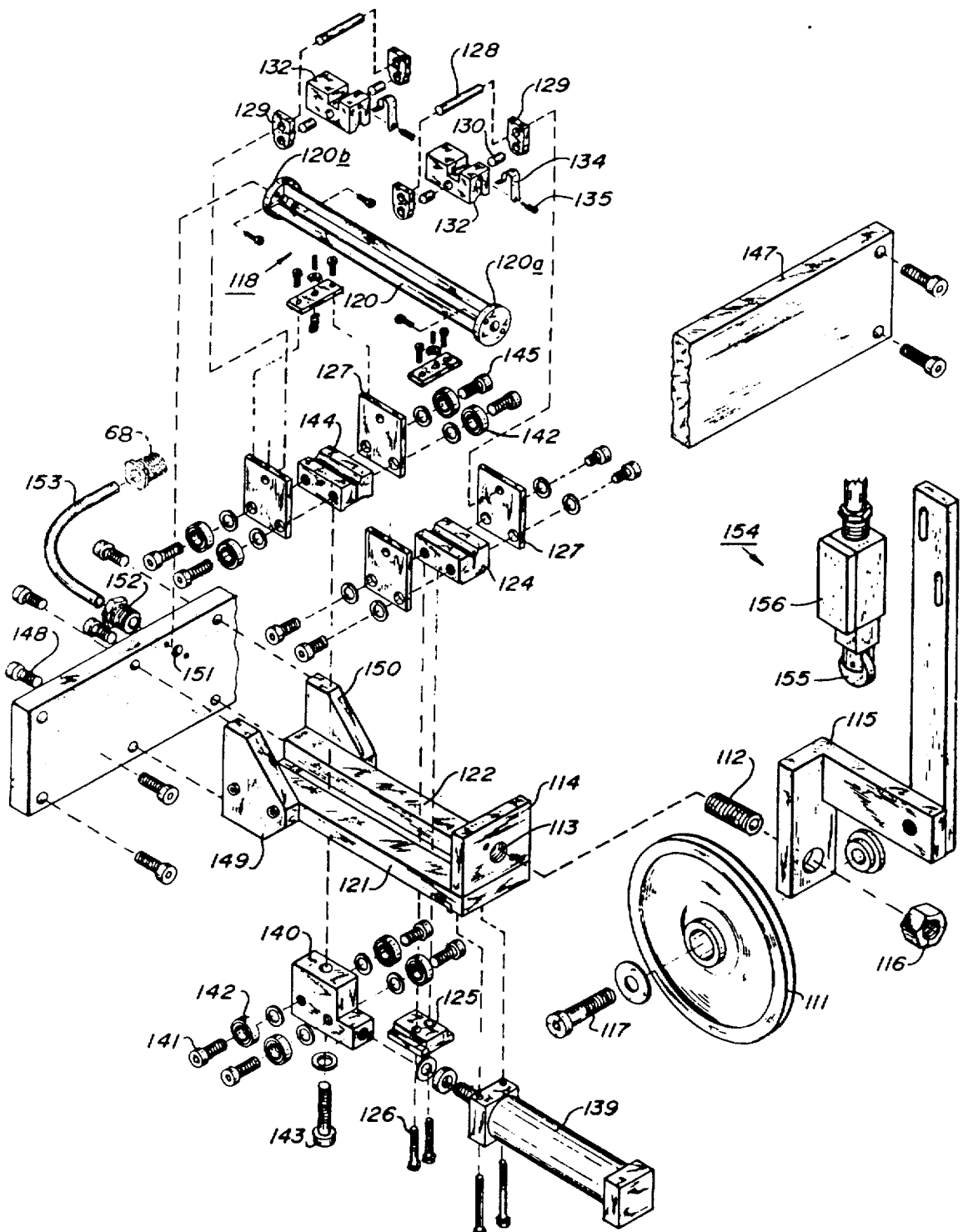

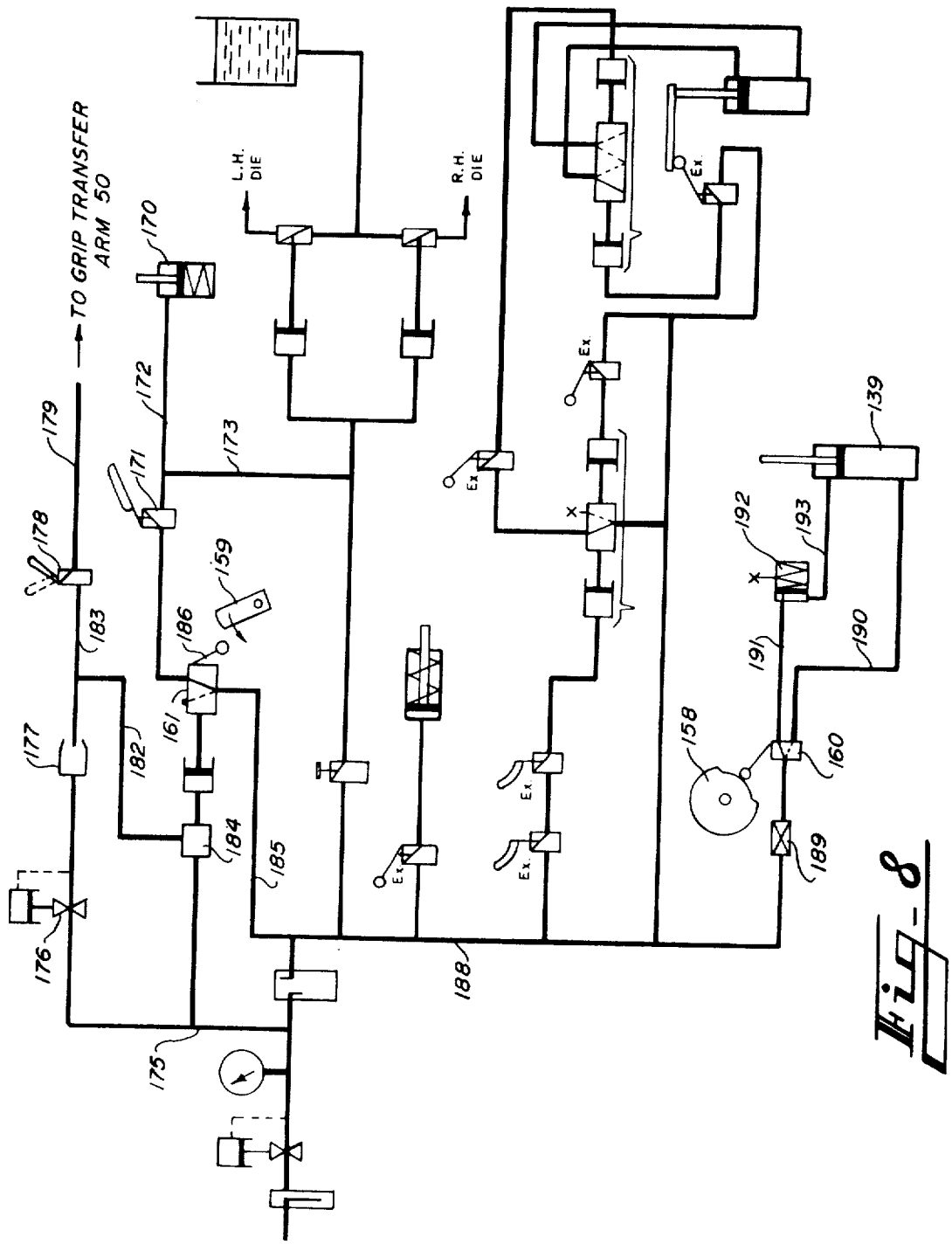

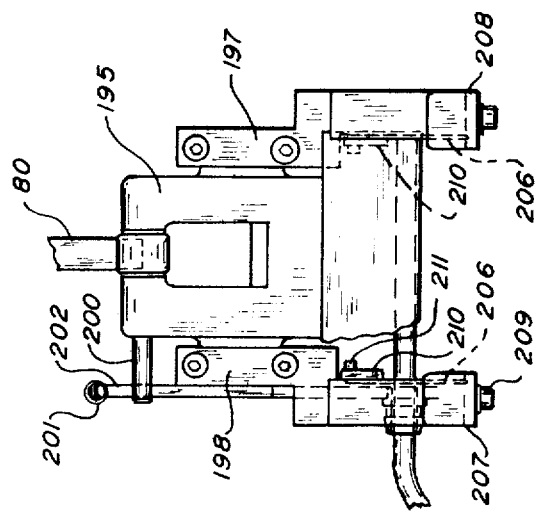
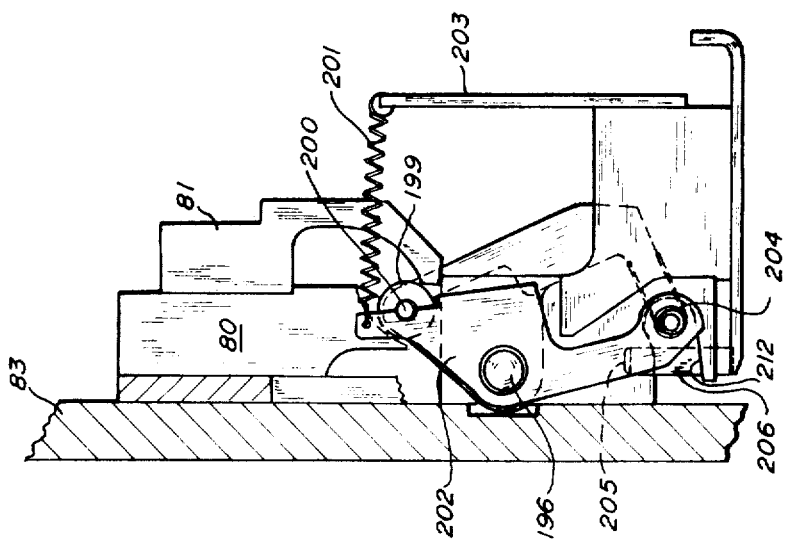

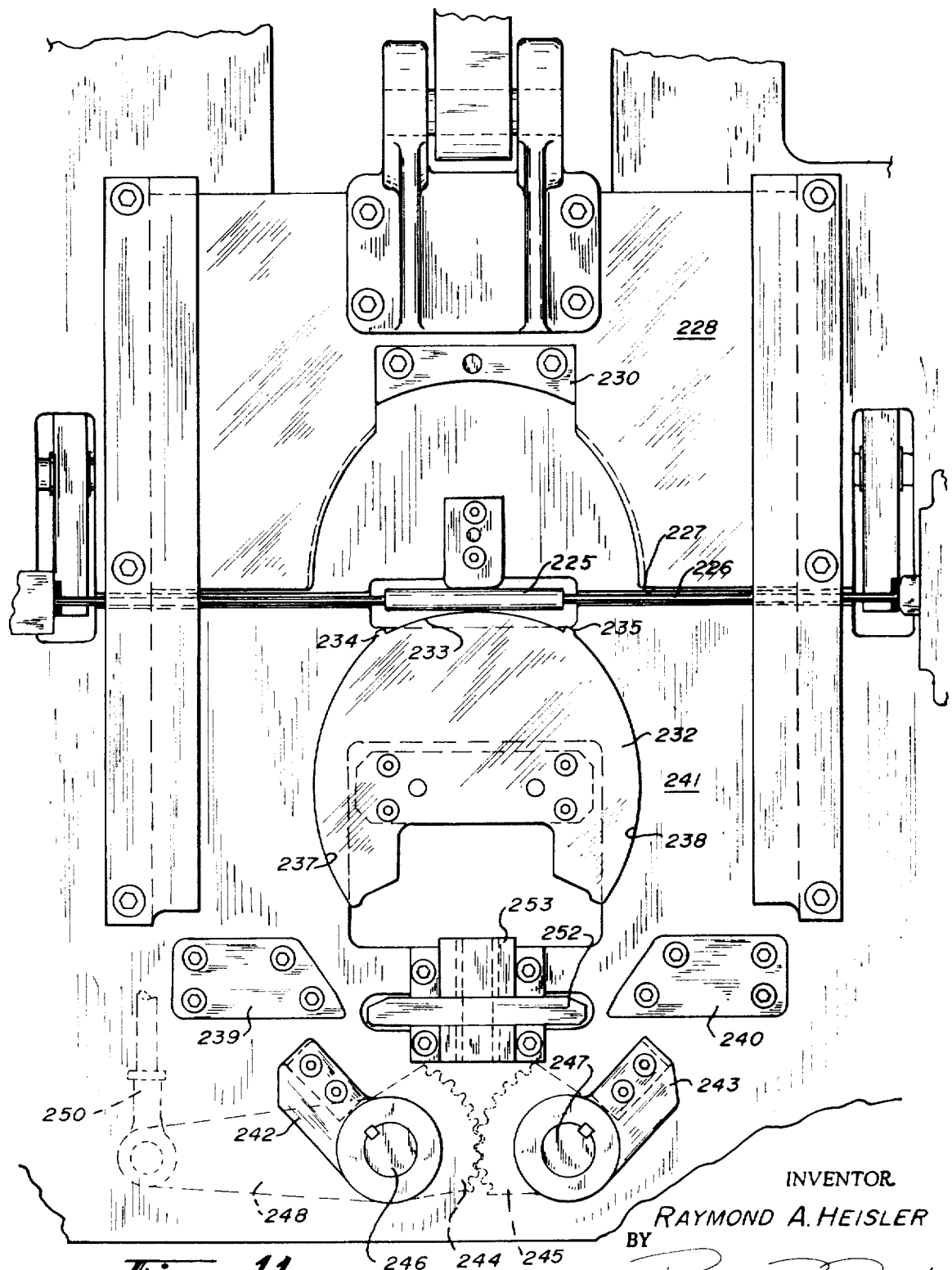

INVENTOR.
RAYMOND A. HEISLER
BY
Ralph R Roberts
AGENT.

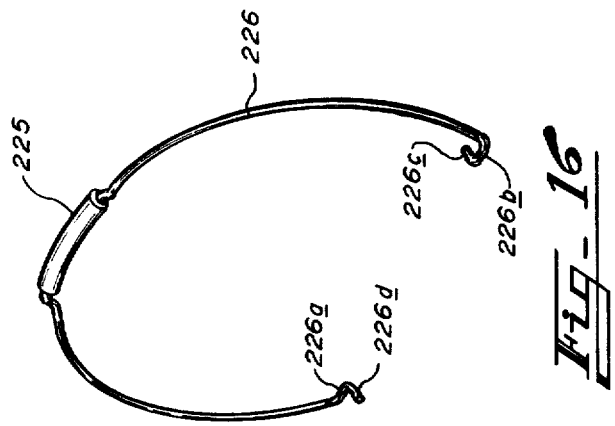
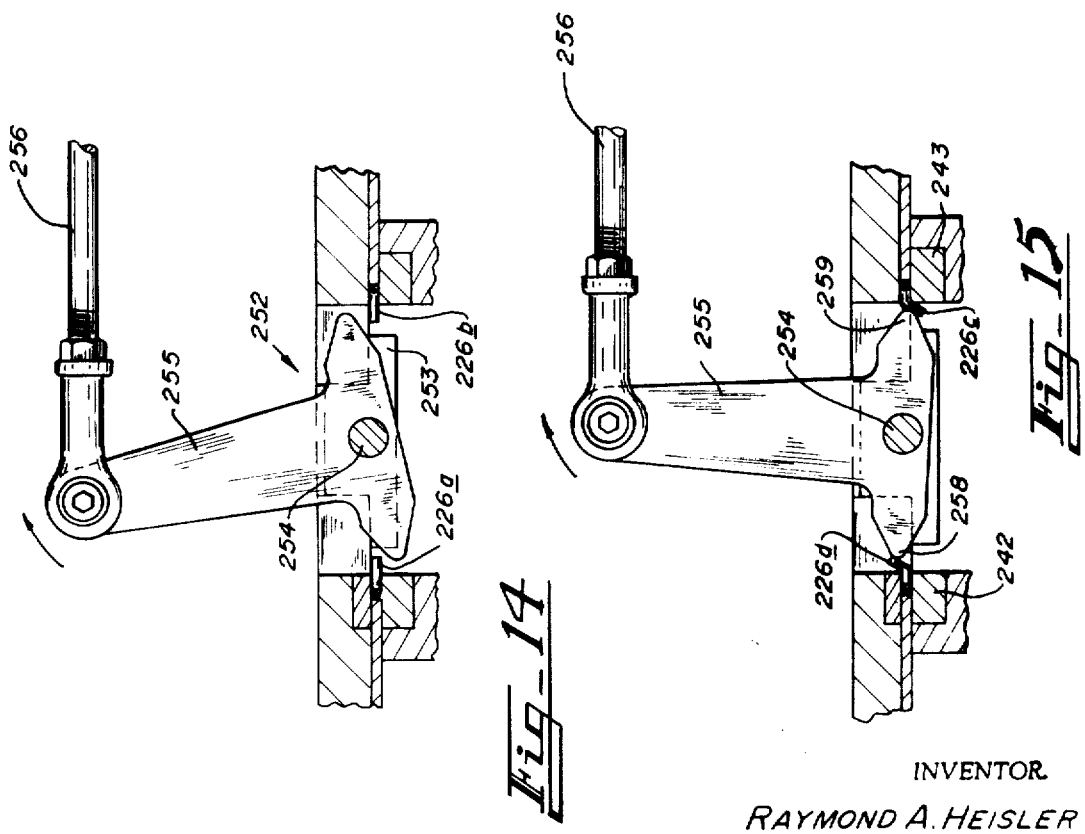

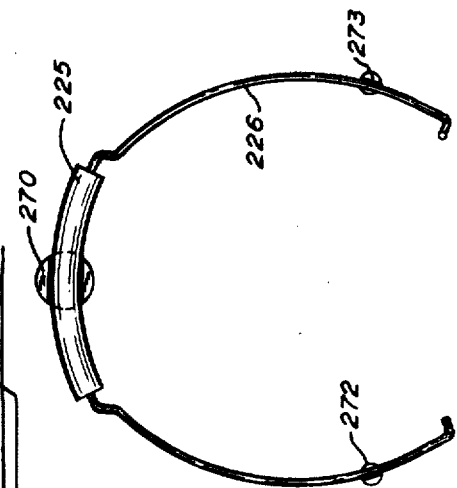
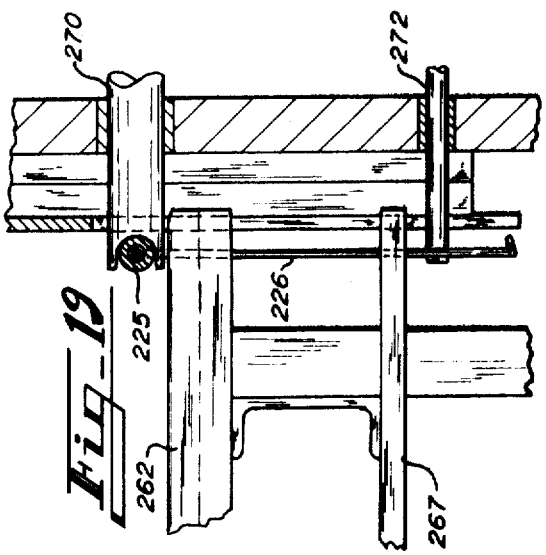
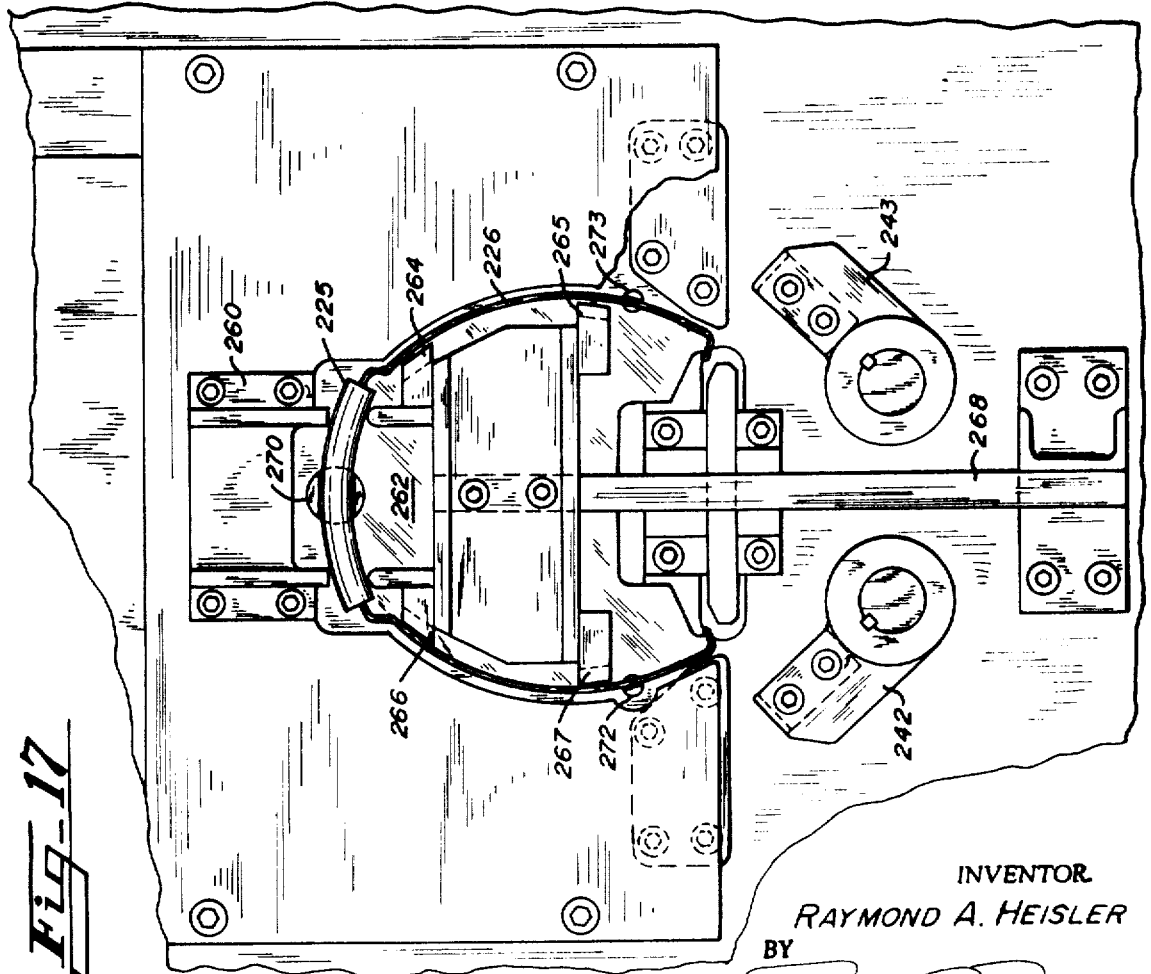
INVENTOR.
RAYMOND A. HEISLER
BY
Ralph R Roberts
AGENT.

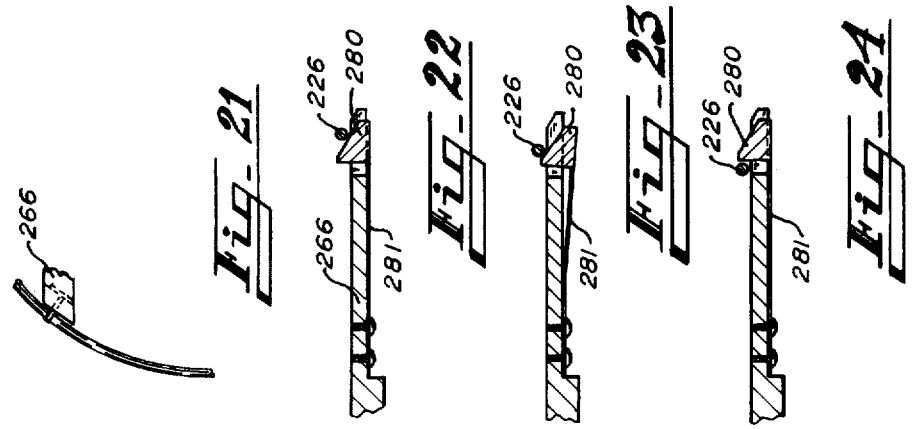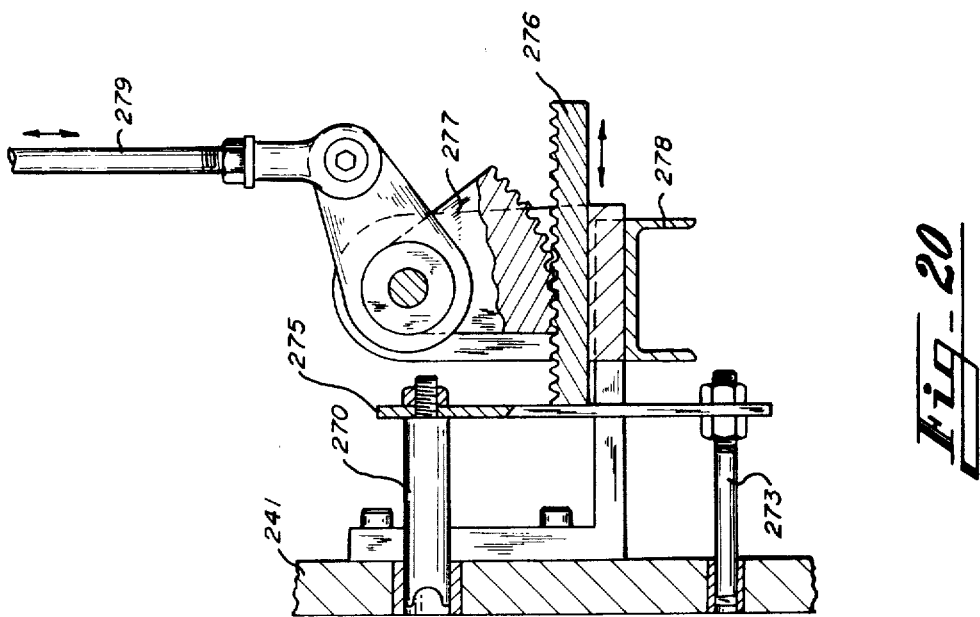

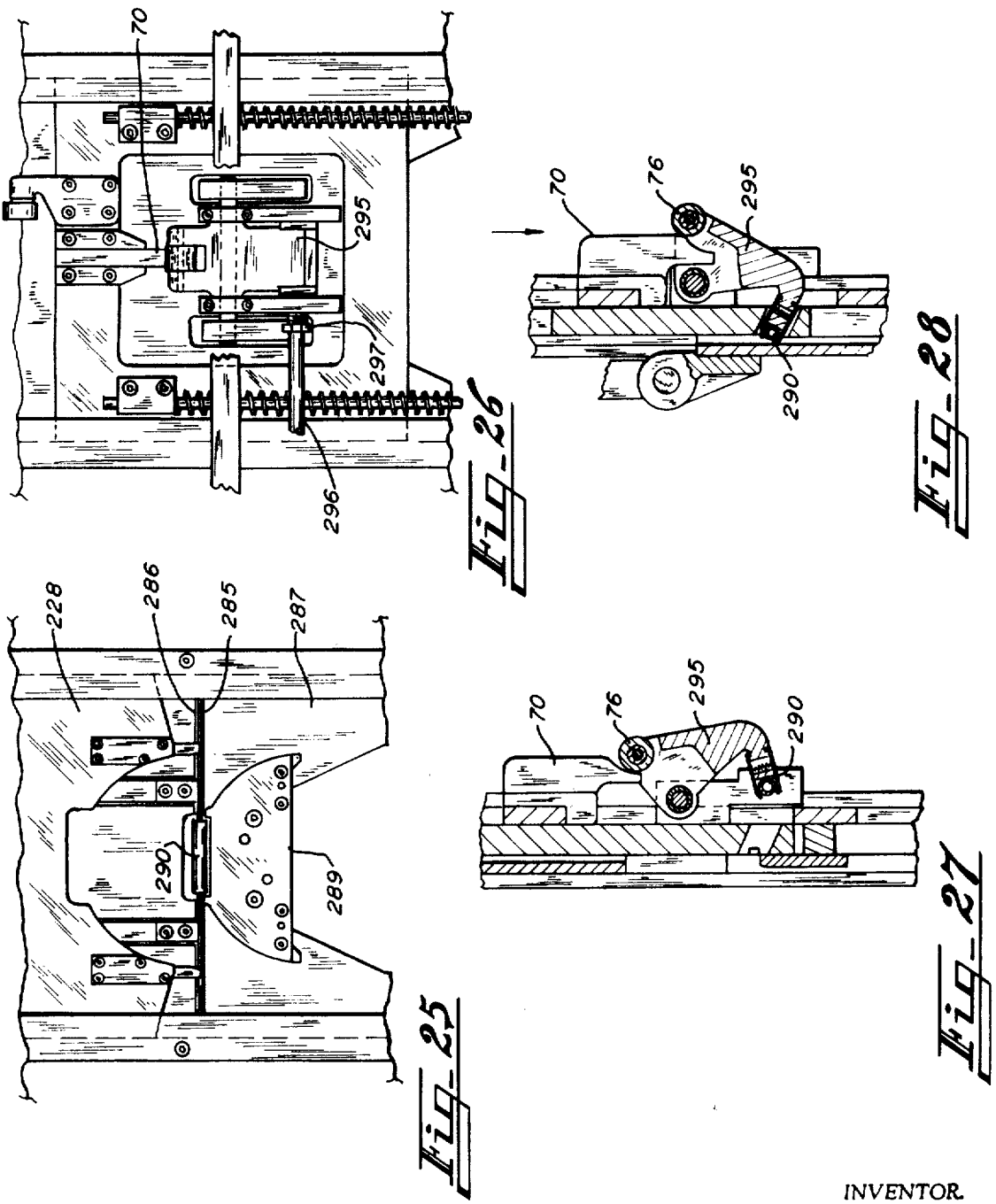

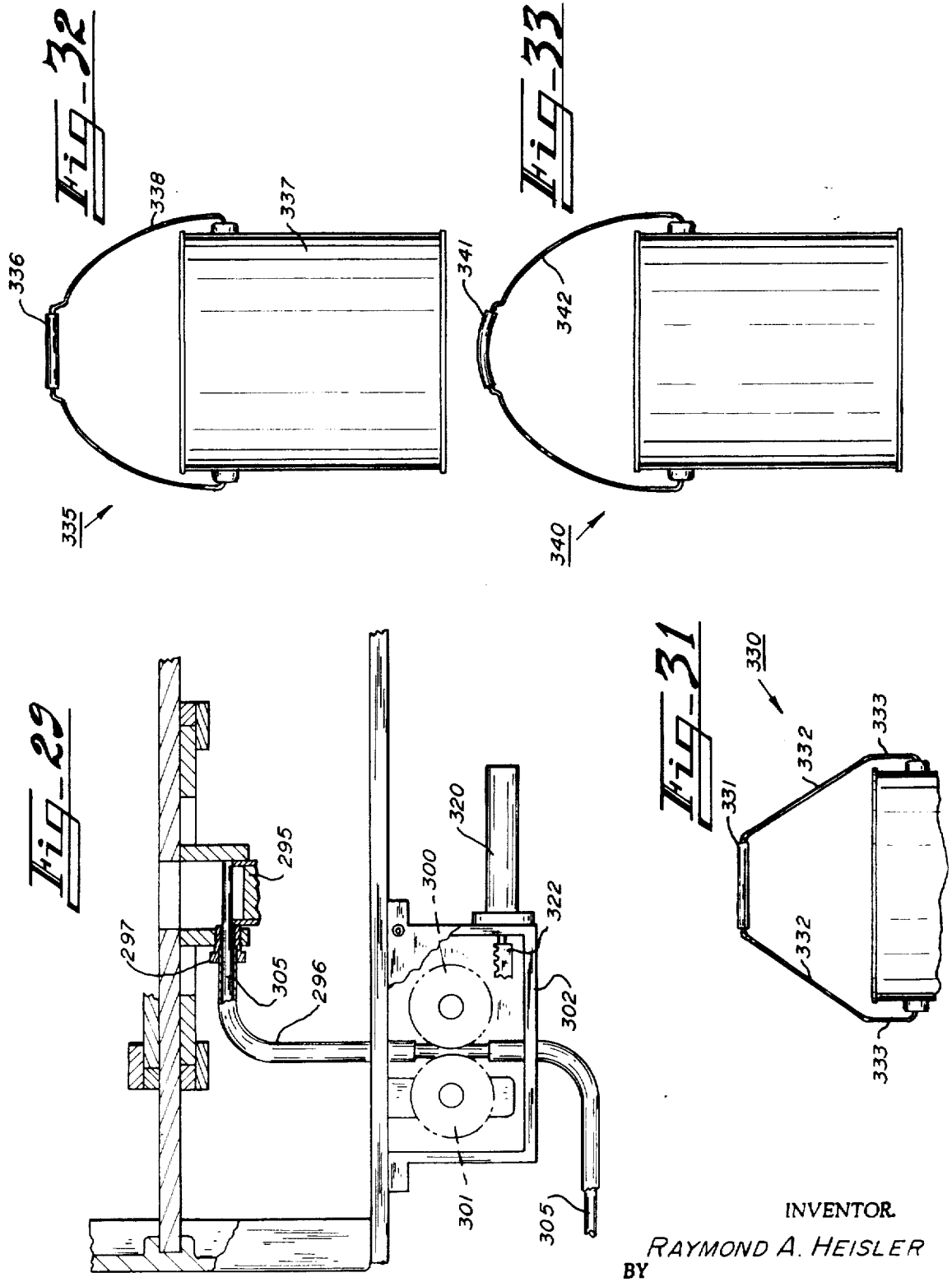

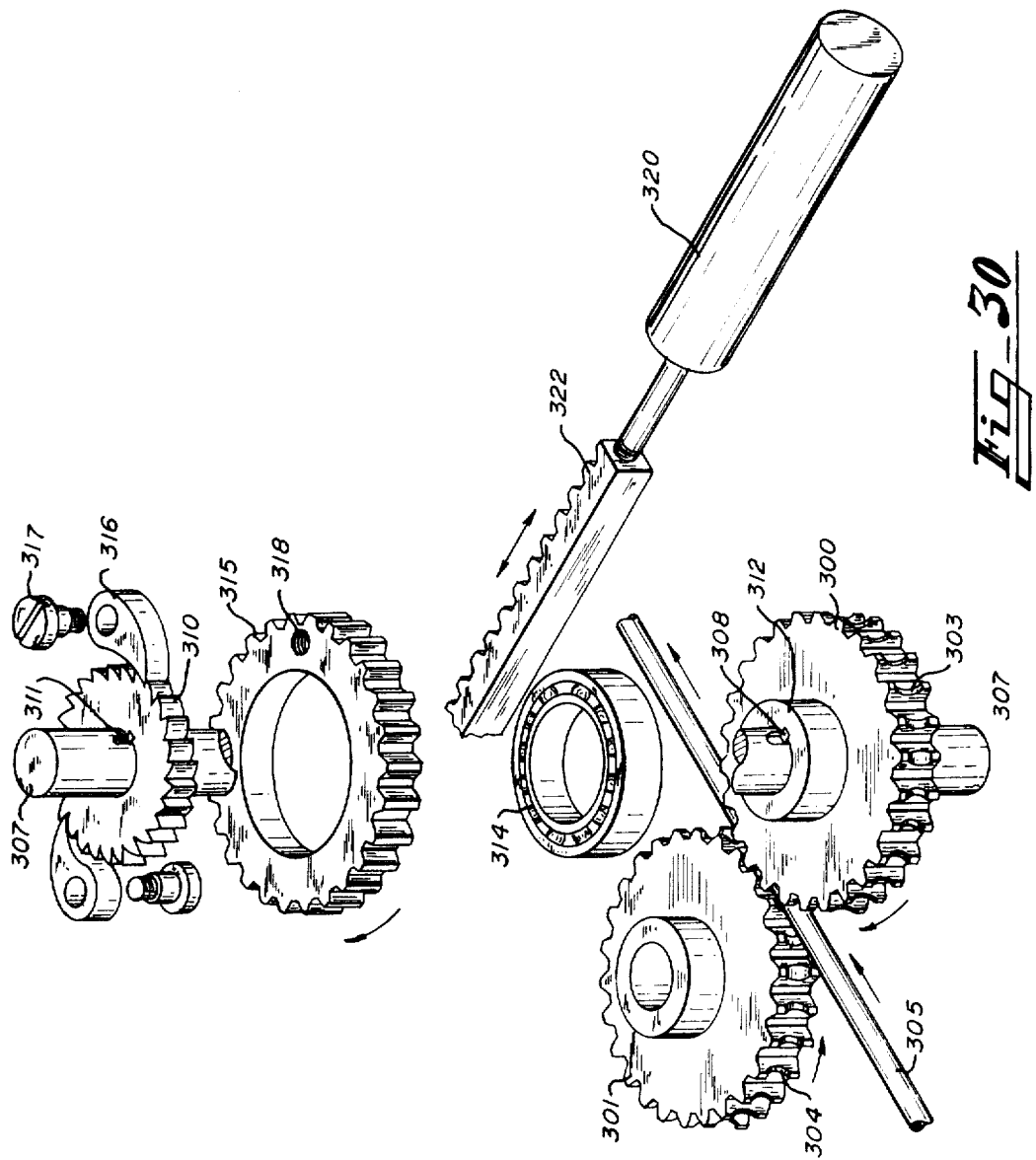

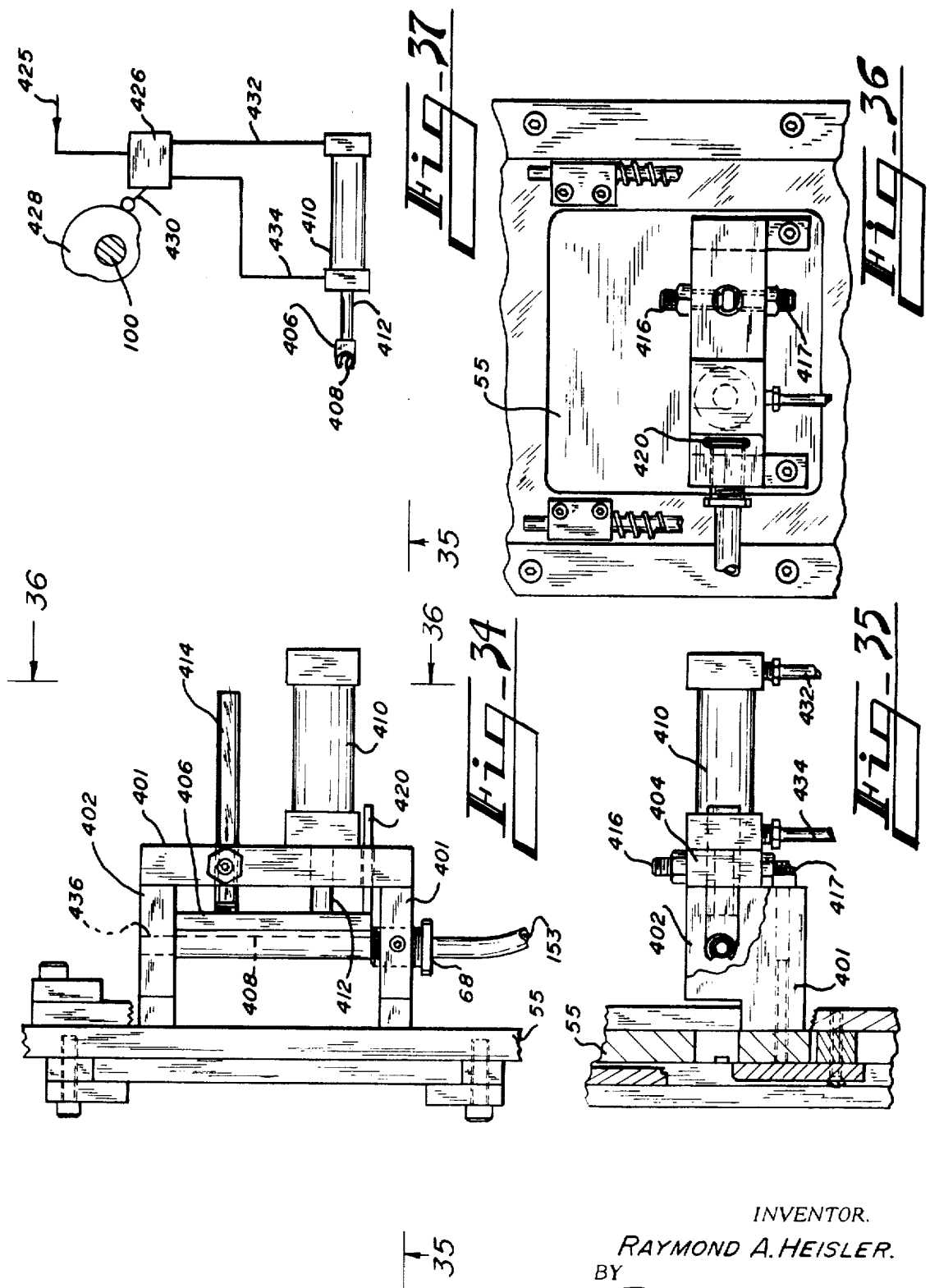

METHOD AND APPARATUS FOR APPLYING PLASTIC GRIPS TO WIRE BAIL HANDLES

This application is a continuation-in-part of application, Ser. No. 825,800, filed May 19, 1969 and having the same title and inventor. With the acceptance of the filing of this continuation-in-part application, the application Ser. No. 825,800 is abandoned.

CROSS-REFERENCE TO RELATED APPLICATIONS

This continuation-in-part application incorporates the basic concept of the wire advancing, cutting and bending as shown in my U.S. Pat. No. 3,241,578 which issued Mar. 22, 1966. A wire bail formed with a plastic grip portion is shown in my U.S. Pat. No. 3,444,905 which issued May 20, 1969. This continuation-in-part application incorporates the basic concept as shown in said patent.

BACKGROUND OF THE INVENTION

1. Field of the Invention

With reference to the classification of art as established in the United States Patent Office this invention pertains to the general class of "Wireworking," and in particular to the subclass of "article making or forming" and more particularly to the further subclass of "bails."

2. Description of the Prior Art

U-shaped bails of wire are well known in the art, and more recently apparatus combining the operation of forming and applying wire bails to eared containers are also well known. In particular, high speed apparatus for forming and applying a wire bail to an eared container in one operation is fully disclosed in my U.S. Pat. No. 3,241,578 of Mar. 22, 1966.

The present invention, to be hereinafter described, relates to the providing of a handgrip of plastic tubing to the midportion of a wire bail as made by mechanism, as for example, in the bail-forming and applying apparatus shown in my above-referenced U.S. Patent. In bails formed and applied by apparatus of this type, the bail is characterized in that it is a single length of wire which is usually of a diameter of about ninety to one hundred twenty-five thousandths of an inch in diameter. This bail is attachable to an eared container often containing paint or other material of heavy consistency. This heavy container becomes difficult or painful to carry by a bail of plain wire. It is known to provide wire bail handles for containers of more than 1 gallon capacity in which, prior to the application of the bail to the container, there is provided a grip support in the form of a U-shape. It is also known to provide a plastic or wooden handgrip which is intended to rotate on the midportion of a formed wire bail. Apparatus and methods for providing an inexpensive plastic handgrip on a wire bail for use on containers as small as one gallon is shown in the present invention.

A method of applying a plastic tube grip portion to wire bail handles is shown in my above-reference U.S. Pat. No. 3,444,905 issued May 20, 1969. In this patent is shown a method and apparatus for providing a wire bail with a portion of plastic tubing of sufficient length to allow grasping by the hand and of a sufficient resilience to cushion the impact of the weight of the contents of the container upon the fingers of the one carrying the container. This tubing length is mounted midpoint of the wire bail. The resulting resilient grip portion is comfortable to grasp and, when desired, permits the use of wire bail of smaller diameter and higher tensile strength for attachment to the eared container.

Insofar as is known a bail-forming and applying mechanism of a type such as is disclosed in my above-identified U.S. Pat. No. 3,241,578 has not been combined with apparatus for automatically providing a handgrip on the bail except as shown in said identified U.S. Pat. No. 3,444,905. The invention as shown and described in this application is an improvement of the apparatus and method of that U.S. Patent and provides an improved means of feeding the tubing to a cutoff and transfer apparatus. Both a preferred embodiment and an alternate embodiment of a tubing transfer arm is shown in the present application. There is also shown apparatus for making a wire bail having a plastic handgrip mounted thereon, this bail having ends formed for the hand attaching of the bail to an eared container.

SUMMARY OF THE INVENTION

The apparatus of this invention is adapted for use with bail-forming mechanism such as identified in my U.S. Pat. No. 3,241,578. In combination with this bail-forming mechanism there is provided an advancing mechanism for plastic tubing. In one embodiment the plastic tubing feeding mechanism includes a pair of one-way grip clamps; one clamp pair is a check means disposed in a fixed relationship to a tubing guide track and arranged to permit the ready advance of tubing to and into the cutoff and transfer mechanism. The other clamp pair is carried by a cycling mechanism and provides a determined linear stroke of movement of the clamp pair by which the tubing is gripped so as to advance the tubing toward the cutoff mechanism. On the return stroke the cycled clamp pair is moved to slide over the tubing and toward the fixedly located check clamp pair.

In another embodiment this mechanism includes a pair of meshed gears which has a recess formed in each of the toothed portions of the gears. In this recess the tubing is fed to a cutoff and transfer mechanism which may be powered by the bail-forming apparatus, so that prior to the feeding of a wire in place in the bail-forming mechanism, a determined length of plastic tubing in a timed relationship to the wire feed is fed for a determined period of time into the cutoff and transferring mechanism. Prior to the feeding of the wire into the bail-forming dies a length of plastic tubing is cut and transferred to a position precisely in the way of the infeeding wire.

In one embodiment the wire bails with plastic grip mounted thereon are made in mechanism for automatically attaching the bails to eared containers. In another embodiment the wire bails with plastic grip mounted thereon are made with ends formed for hand attaching of the bail to an eared container.

In one embodiment there is shown a tubing cutting arrangement wherein a pair of razor blades is disposed so as to precisely cut a portion of the tubing to provide a trimmed end of the cut and transferred tubing.

It is an object of this invention to provide with wire bail-forming apparatus a bail having a plastic tubing handgrip disposed intermediate its ends. This handgrip portion is formed with the midportion of the bail and is supplied to a cutoff and transfer mechanism by a tubing advancing mechanism.

It is a further object of this invention to provide in combination with a wire bail-forming apparatus, a tubing receiving and transfer arm having an open-sided longitudinal receiving groove sized to slidably receive and retain for forward transfer a length of resilient tubing which is a loose fit on the straight length of wire as fed to the bail-forming apparatus. The groove has a relief slot provided in its forward edge, said slot is made of a determined width sufficient to enable the length of tubing to be locally compressed and displaced from its round condition to permit the tubing and wire therein to be drawn through the slot as the transfer arm is moved from a bail-forming position to a tubing receiving condition.

There has been chosen a specific embodiment of apparatus and method of mounting a grip portion of plastic tubing on a wire bail which is automatically applied to eared containers. There has also been chosen a specific embodiment of apparatus and method of making a wire bail for attaching to an eared container, this wire bail having a grip portion of plastic tubing fed by a tubing feeding mechanism. An alternate embodiment of a tubing cutoff mechanism is shown in which razor blades are used to provide smooth-cut tubing ends. A preferred and alternate embodiment of both a transfer arm assembly and a drive for the arm are shown in the following description and drawings.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements.

For this reason the specific embodiments and alternate embodiments thereof have been chosen for the purposes of illustration and description as shown in the accompanying drawings wherein:

BRIEF DESCRIPTION OF THE DRAWINGS

FIG. 3 represents a front and face view of the bail-forming apparatus of FIG. 1 and looking upstream from the downstream side of the bail-forming apparatus and showing in particular the placement of the transferred tubing in relation to the wire and the bail-forming dies of the bail-forming apparatus;

FIG. 4 represents a side view, partly in section, of a preferred embodiment of a tubing advancing mechanism using a reciprocating movement to feed the tubing a determined amount;

FIG. 5 represents a sectional view of the tubing advancing mechanism with the view being taken on the line 5—5 of FIG. 4 and looking in the direction of the arrows;

FIG. 6 represents another sectional view of the tubing advancing mechanism with the view being taken on the line 6—6 of FIG. 4 and looking in the direction of the arrows;

FIG. 7 represents an exploded isometric view showing the components and their arrangement as used in the tubing advancing mechanism of FIG. 4;

FIG. 8 represents a flow diagram of the pneumatic control system providing for the cycle operation of the tube cutting and transfer mechanism in combination with the bail-forming apparatus;

FIG. 9 represents a side view of an alternate embodiment of a tubing cutoff and transferring mechanism in which a razor blade is provided and actuated to insure a smooth cutting of an end of the tubing;

FIG. 10 represents a face view of the cutoff and transfer mechanism of FIG. 9;

FIG. 11 represents a face or front view of an alternate bail-forming apparatus in which the wire bail is provided with a plastic grip and the ends of the wire bail are formed so that the ends are turned at right angles to the plane of the bail to enable the bail to be hand inserted into an eared container;

FIG. 14 represents a fragmentary enlarged plan view of the arrangement of the apparatus for turning the ends of the wire bail to a position which is at substantially right angles to the plane of the bail;

FIG. 15 represents a plan view of the apparatus of FIG. 14 with the apparatus moved so as to form the substantially right angle bends of the ends of the bail in its final formed condition;

FIG. 16 represents an isometric view of a hand-attachable bail in a completely formed condition and with the ends formed as in FIG. 15;

FIG. 17 represents a face view of the bail-forming apparatus of FIGS. 11–15 but with bail-accumulating and transport apparatus mounted thereon;

FIG. 18 represents a diagrammatic face view showing a preferred positioning of the transferring pins as provided with and actuated with the apparatus of FIG. 17;

FIG. 19 represents a fragmentary side view of the bail-accumulating and transport apparatus of FIG. 17;

FIG. 20 represents a side view of the accumulating apparatus of FIG. 19, the view being partly in section and showing the mechanism in a bail-receiving orientation condition of operation and further showing in particular the manner in which a cycling motion is provided to the bail-ejecting and transporting mechanism;

FIG. 21 represents a somewhat diagrammatic and fragmentary end view showing a bail guide member with a bail-retaining end clip disposed to insure the aligned retention of the bail on the slide guides of the accumulating member;

FIG. 22 represents a fragmentary side sectional view of the clip of FIG. 21 and showing the retaining clip disposed to receive a just-formed bail;

FIG. 23 represents the retaining clip of FIG. 22 with the bail-retaining clip portion being deflected from the path of the advancing bail;

FIG. 24 represents the bail-retaining clip of FIG. 23 after the bail has been moved leftwardly beyond the bail-retaining clip shoulder portion;

FIG. 25 represents a face view of an alternate pair of bail-forming dies disposed to bend the bail so that the handgrip portion is a straight configuration;

FIG. 26 represents the back view of the bail-forming apparatus of FIG. 25 and showing the plastic tube receiving and transfer apparatus;

FIG. 27 represents a sectional view of the apparatus of FIG. 26 and showing in particular the grip transfer arm in the tubing receiving position;

FIG. 28 represents the sectional view of FIG. 27 but with the grip transfer arm moved to bring the cut tube into the wire-receiving position;

FIG. 29 represents a plan view, partly diagrammatic, of an alternate plastic tubing feeding mechanism;

FIG. 30 represents an exploded isometric view of the alternate tubing feeding mechanism of FIG. 29 by which is effected the delivery of a predetermined precise length of tubing to a cutoff and transfer apparatus;

FIG. 31 represents a fragmentary view of an eared container with a bail mounted in the ears of the container and showing a bail in which the handgrip portion is a substantially straight length and is substantially parallel to the axis of the ears of the container, the side length portions of the bail also being straight portions;

FIG. 32 represents an alternate configuration of the bail of FIG. 31, but with the side portions of this bail formed as curved lengths rather than as two straight portions;

FIG. 33 represents a bail similar to the bail of FIG. 32 but with the plastic grip portion of this bail, in addition to being offset from the general curve of the bail, also curved in the same general arc of the bail;

FIG. 34 represents a plan view, partly fragmentary and diagrammatic, of an alternate plastic tubing receiving cutoff and transfer mechanism as adapted for high speed operation;

FIG. 35 represents a side view, partly in section of the mechanism of FIG. 34, the view taken on the line 35—35 of FIG. 34, and looking in the direction of the arrows;

FIG. 36 represents a rear view of the mechanism of FIG. 34 and looking in the direction of the arrows, and FIG. 37 represents a partly diagrammatic schematic view of the air supply circuit and regulatory system by which the mechanism of FIG. 34 is actuated.

In the following description and in the claims various details will be identified by specific names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention.

DESCRIPTION OF THE TUBING CUTOFF AND TRANSFERRING MECHANISM AS USED WITH AN AUTOMATIC BAIL-FORMING AND ATTACHING MECHANISM

Figure 1:
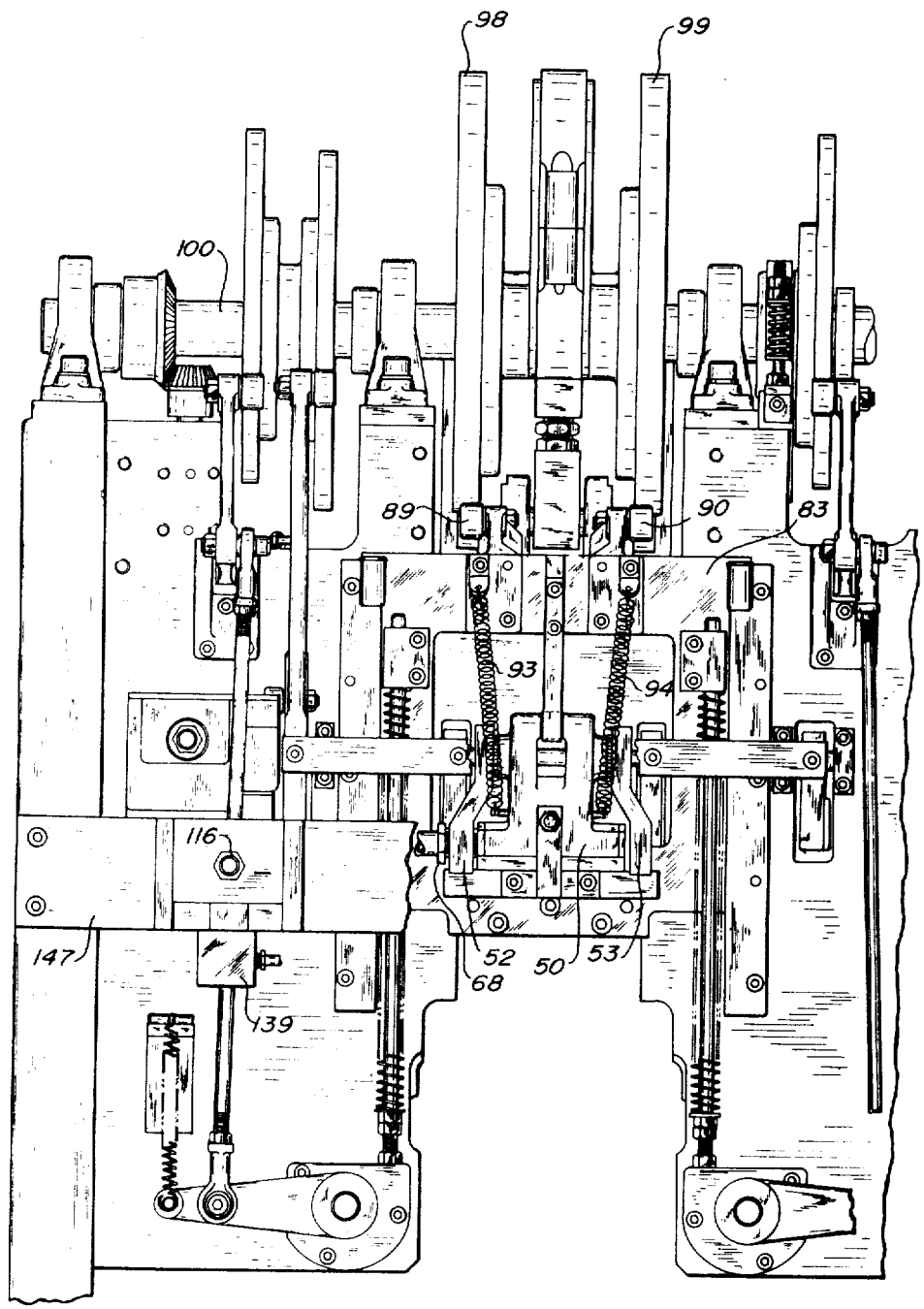
FIG. 1 represents a face view looking downstream from the upstream side of an automatic bail-forming apparatus and showing in particular the arrangement thereon of one embodiment of a tubing cutoff and transfer mechanism.
Figure 2:
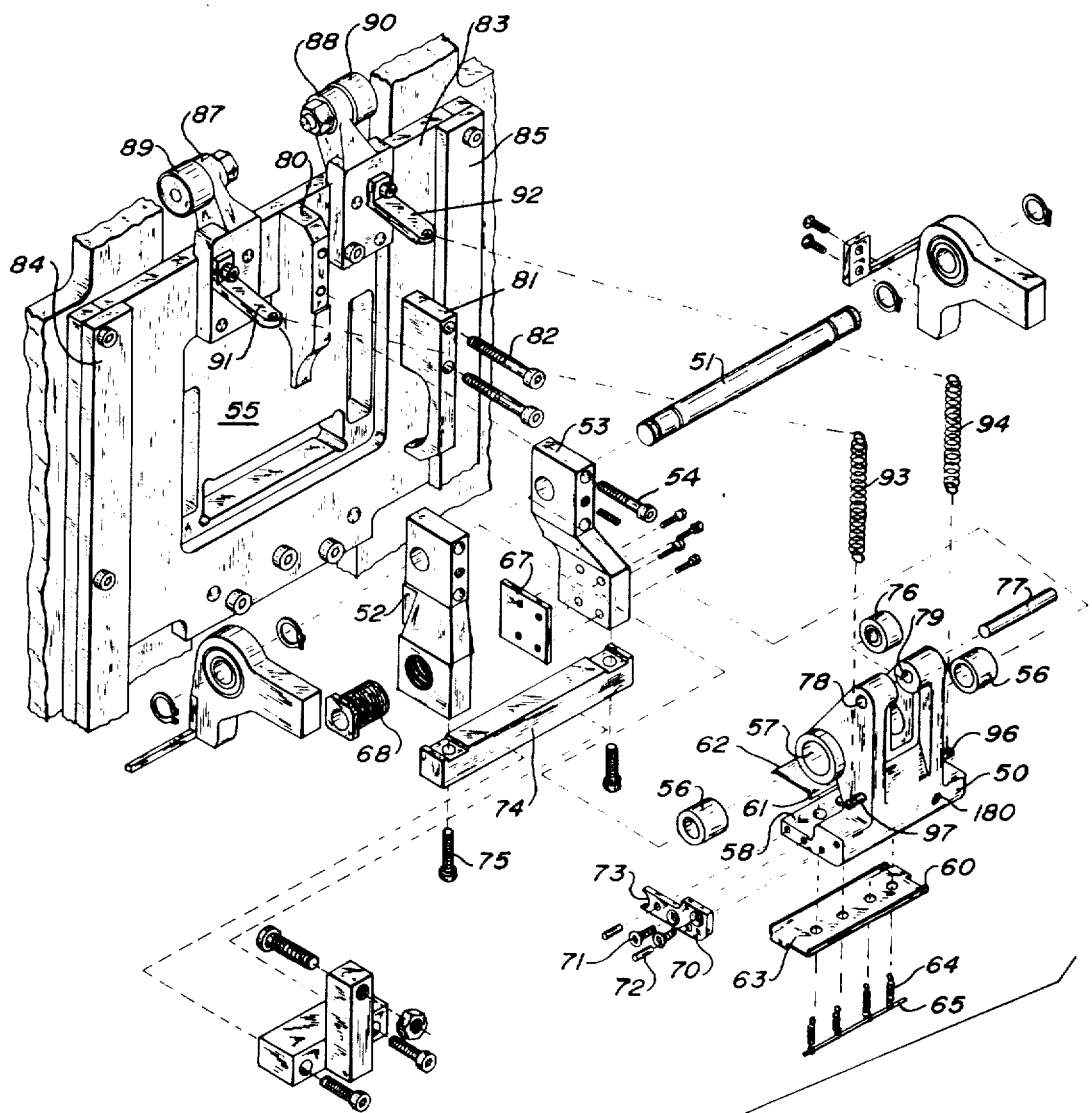
FIG. 2 represents an exploded isometric view of the tubing cutoff and transfer mechanism as shown in FIG. 1.

Referring now to the tubing cutoff and transfer mechanism as shown in FIGS. 1 and 2, there is provided a grip transfer arm 50 which is pivotally carried by a shaft 51. This shaft is fixedly mounted in blocks 52 and 53 which are attached by screws 54 to a main plate 55. This main plate, as shown, is also the main plate of a wire bail-forming apparatus such as shown in my U.S. Pat. No. 3,241,578 above-identified. Bearing bushings 56 are press-fit mounted in bores 57 in arm 50 so that this arm is freely rotatable around this shaft. Lower forwardly extending tongue 58 is formed as a part of the arm 50 and is grooved in the rearward portion of the upper and lower surfaces to provide retaining and engaging means for the turned inner edges 60 and 61 of upper and lower grip plate 62 and 63. These grip plates are resiliently retained on tongue 58 by means of springs 64 extending through holes formed in the upper and lower grip plates and also formed in the tongue 58. Upper and lower spring holder rods 65 are arranged to engage and retain the ends of the springs which are stretched so as to urge the plates 62 and 63 toward the tongue 58. As assembled, the upper and lower plates as they lay on the forwardly extending tongue are disposed to provide a guideway for a length of plastic tubing fed by mechanism to be hereinafter described.

On the inner surface of block 53 there is attached a thrust plate 67 which is made of a selected thickness to provide a determined stop for the advancing plastic tubing. In block 52 there is threadedly mounted a cutoff bushing 68 which is preferably of hardened steel and has a base which is sized to snugly and slidably retain an advancing length of tubing. Attached to the lower left-hand side of the grip transfer arm 50 is a hardened grip cutoff knife 70 which is removably attached to the arm 50 by means of flat head screws 71 and is maintained in a precise position by dowels 72. The forward portion of knife 70 is formed so as to provide a semicircular cutout 73 sized to slidably engage the outside of the plastic tubing.

As assembled, arm 50 has knife 70 attached by screws 71 to the side of said arm. The bushings 56 are mounted in bores 57 and then the shaft 51 is slid through these bushings and also through the holes in blocks 52 and 53. With thrust plate 67 attached to block 53, the blocks 52 and 53 are mounted on main plate 55 by screws 54. Cutoff bushing 68 is mounted in block 62 and is adjusted so that cutoff knife 70 as it is swung on arm 50 is adjacent to the inner end of the bushing. To insure precision and rigidity in the spacing and prevent unwanted movement, a stiffener bar 74 is attached by cap screws 75 to the underside of blocks 52 and 53.

Rotational movement of arm 50 is provided by means of a camming mechanism which includes a cam follower bearing 76 carried by shaft 77 mounted in aligned holes 78 and 79 in the upper portion of arm 50. This bearing 76 is retained in and is actuated by a box cam formed as a combination of an inner cam 80 and an outer cam 81 which are attached by screws 82 to a movable plate 83 slidably retained by slide guides 84 and 85. Movable plate 83 and guides 84 and 85 are part of the bail-forming apparatus above-identified. The movable plate 83 is carried on the rear face of the main plate 55. Attached to the upper end of plate 83 are cam follower brackets 87 and 88 which have mounted on their upper ends rotatable cam followers 89 and 90. Extending outwardly from these brackets are spring brackets 91 and 92 which are disposed to receive and retain the upper ends of tension springs 93 and 94. The lower ends of these springs are mounted on and retained by pins 96 and 97 mounted in and extending from the arm 50. It is to be noted that the pins are disposed to the rear of the axis of bushing 56 so that the tensioned springs 93 and 94 tend to urge the arm 50 counterclockwise around the shaft 51. This spring action results in cam follower 76 tending to engage the outer face of the inner cam 80. Reciprocating motion is imparted to movable plate 83 by a pair of cams 98 and 99 carried on an upper shaft 100 of the bail-forming mechanism. These cams are seen in FIG. 1 wherein is also shown the disposition of the springs 93 and 94 in their relationship to the grip transfer arm 50.

DESCRIPTION OF A PLASTIC TUBING MECHANISM USED IN CONJUNCTION WITH THE AUTOMATIC BAIL-FORMING AND ATTACHING MECHANISM

Referring next to a preferred embodiment of a tubing feeding mechanism as seen in FIGS. 4, 5, 6 and 7 there is shown apparatus where from a supply reel there is supplied a length of plastic tubing 110 which, as it is advanced, is carried over a grooved pulley 111 and to and through a guide bushing 112 threadedly mounted in a threaded hole 113 formed in a slide block guide and frame 114. Pulley support bracket 115 is mounted on bushing 112 and is retained in position by means of a nut 116. A cap screw 117 acts as a shaft for pulley 111 and is carried in a threaded hole in bracket 115. A tubing guide generally identified as 118 in FIG. 7 in the exemplified form includes four guide rails 120 retained by end plates 120a and 120b. The end plates 120a and 120b have centrally positioned bores sizes to act as guides for the tubing 110. The four guide rails as seen in FIGS. 5 and 6 are spaced so that their inner edges collectively act as a tubing guide.

Frame 114 includes a pair of bottom rails 121 and 122 upon which is mounted a front fixed block 124. This block is clamped to the rails by means of guide clamp 125 and screws 126. Clamp 125 may be loosened to permit adjustment of block 124 along the rails. A hinge plate 127 is mounted on each side of the front fixed block 124 and carries a pin 128 upon which is pivotally mounted a pair of links 129. The lower portion of each of these links is provided with a hole sized to snugly receive and retain a pivot pin 130. A cap member 132 has holes disposed in its side, which holes pivotally receive the pivot pins 130.

As particularly seen in FIGS. 4, 5 and 7 the front fixed block 124 has its upwardly facing surface grooved to receive one of the guide rails 120 and adjacent this groove the block is chamfered to provide a guide surface for the plastic tubing. In like manner the cap member 132 has its downwardly facing surface grooved to receive one of the guide rails 120, and adjacent this groove the cap member is chamfered to provide a mating guide surface for the plastic tubing. A flat spring 134 has one end engaged by a set screw 135 carried in one upwardly extending portion of the cap member and the other end of the spring engages pin 128. Left of the pin is a bridge block 136 which is attached to the hinge plates 127 and between this block 136 and the top of the cap there is disposed a compression spring 137.

Still referring to FIGS. 4 through 7 there is exemplified a movable plastic gripping mechanism which uses as a cycling means an air cylinder 139 which is mounted to the underside of the tubing guide assembly 118 and as viewed in FIG. 4 toward the right end of the assembly shown. To the end of the piston rod of cylinder 139 is attached a slide block 140 which has transversely drilled and threaded holes formed therein to receive cap screws 141. These cap screws retain and position ball bearing rollers 142. As shown, there are four such rollers mounted to the slide block and these rollers are arranged in pairs and are disposed to engage the underside of bottom rails 121 and 122. A vertically disposed hole in the upstanding portion of block 140 provides a passageway for bolt 143 which engages a threaded hole in the underside of pusher block 144. The upper portion of block 140 is sized to slide between bars 121 and 122 which provide a guide control for the reciprocation stroke of the tubing pusher arrangement. Pusher block 144 is configured like block 124 but instead of being fixed as block 124 is reciprocably moved by cylinder 139.

The construction of the upper portion of the tube pusher assembly is substantially identical to the fixed tube gripping mechanism in that a cap member 132 is carried between a pair of hinge plates 127 and is supported therebetween by links 129. What is different is that to the outside of the hinge plates there is mounted by means of cap screws 145 four ball bearing rollers 142. These rollers are disposed directly above the lower-like rollers and this grouping of rollers is spaced so as to engage the rails 121 and 122 in a smoothly rolling manner (FIG. 6).

Referring particularly to FIGS. 1, 4, 6 and 7 it is noted that a grip-feed mounting bar 147 is drilled to receive and position cap screws 148 which hold gussets 149 and 150 to the bar. These gussets retain rails 121 and 122 in position and support the outward extending portion of the tubing feeding mechanism. A hole 151 provides a guide for the tubing 110 through bar 147. A bushing 152 is mounted to the bar 147 and is aligned with hole 15 so as to guide the plastic tubing 110 as it enters a feeding tube elbow 153 which guides the plastic tubing to the cutoff bushing 68 shown in phantom outline and above-described in conjunction with the tubing cutoff and transfer mechanism shown in FIG. 2.

OPERATION OF THE TUBING FEEDING MECHANISM OF FIGS. 4, 5, 6 AND 7

Tubing 110 is fed from a storage reel (not shown) to and over grooved pulley 111 and through bushing 112, end plate 120a and between front fixed block 124 and its cooperating cap member 132. The tubing is continued between the guide rails 120 to and through end plate 120b, thence through hole 151, bushing 152, elbow 153 and cutoff bushing 68. Pusher block 144 and its cooperating above-disposed cap member 132 are reciprocated by means of cylinder 139 and the movement of the attached slide block 140. The feeding of a determined length of tubing is accomplished by the movement of this pusher assembly with the slide block 140 to its rightward extreme determined position near or next to the fixed grip assembly. The cylinder 139 is then actuated to move the rod outwardly and the attached block 140 leftwardly toward mounting bar 147. The pivotally supported cap member 132 as urged downwardly toward block 144 by spring 137 is moved into gripping condition by the arc of motion of member 132 around pin 128. The guide rail 120 limits the downward movement of member 132 and prevents an excessive downward gripping action of member 132 on tube 110. At the determined forward extent of the feeding stroke of the cylinder 139 the tubing 110 has been advanced a determined amount into the cutoff and transfer mechanism above-described.

The fixed tube gripping arrangement provided by the fixed block 124 and cap member 132 now comes into action to insure that the just-advanced tubing 110 is not drawn backwardly by the return stroke movement of slide block 140. Any reverse movement of tubing 110 causes the cap member 132 above block 124 to swing downwardly to grip the tubing as the block 140 is moved toward cylinder 139. This return movement of the block 140 causes the engagement of cap member 132 to swing outwardly and upwardly against the action of spring 137, and releases the grip on the tubing by block 144 and the above cap member 132. On the succeeding feeding stroke of block 140 the cap member 132 carried above front fixed block 124 is swung outwardly and upwardly to release its check movement gripping condition of the tubing 110.

Supply detection means is also provided in this mechanism that there is no stopping of the supply of the plastic tubing feeding mechanism. The present embodiment detection device 154 is shown in FIGS. 4 and 7 wherein a roller 155 is adapted to engage the tubing passing to the grooved pulley 111 and as the tubing is supplied to the feeding mechanism the roller 155 is lifted by the tubing. The absence of tubing in this flow permits the roller 155 to drop causing a switch 156 to be actuated. Preferably this switch actuation shuts off the bail-making mechanism.

Provision is preferably made to insure that a length of plastic tubing has been cut and transferred to a determined position in way of an advancing wire to the bail-making mechanism. Referring particularly to FIG. 3 there is shown as mounted on the right end of main crank shaft 100 a pair of cams 158 and 159 which respectively engages and actuates valves or switches 160 and 161. The operation and function of these switches is described in conjunction with the control circuit diagram shown in FIG. 8 described below. It is also to be noted that in FIG. 3 a cut length of tubing 162 is shown in place between upper and lower dies 163 and 164 and mounted on a length of wire 165 which is moved through a die in bracket 166 and is cut by the forward movement of arm 166a. This operation and structure is more fully described in my U.S. Pat. No. 3,241,578 reference above. In the operation of the bail-forming and applying mechanism it may be desirable to provide plain bails without the plastic grips. Provision is therefore made to operate the bail-attaching machine to produce a plain wire bail. In and during this operation the cutoff and transfer mechanism and the tubing advancing mechanism is made inoperative and filler dies 167 and 168 are mounted to and in the upper and lower wire-forming dies of the bail-forming apparatus.

CONTROL CIRCUIT OF FIG. 8

Referring next to the flow control diagram of FIG. 8 it is contemplated that pressurized air is to be used. In this circuit it is to be noted that a pneumatic cylinder 170 is provided and used for the actuation of the clutch of the bail-forming apparatus. A detection valve 171 is adapted to use the presence of an eared container in the bail-applying apparatus to open this valve and line 172 to the flow of air to cylinder 170 and to a line 173 supplying air to actuate a lubrication system for the end-forming dies and other controls and detection systems necessary for the operation of the wire bail-forming and applying mechanism. From air supply line 175 air is fed to regulator 176 thence to restrictor 177 and then to a snap-action valve 178. From this valve air is fed through conductor 179 to an orifice discharge formed in the grip transfer arm 50. Conductor 179 supplies air so as to flow to and through inlet 180 formed in a back port in the transfer arm 50 as seen in FIG. 2. Conductor 182 (FIG. 8) leads from line 183 to a dampener 184 and then to an air-actuated valve 161 which is supplied with pressurized air from the supply line 185. This valve 161 is reset by the actuation of its roller arm 186. The roller of this arm is engaged by cam 159 so as to reset the valve 161 to the open(dashed outline) position with every rotation of shaft 100.

Still referring to FIG. 8, it is to be seen that from the air supply, a line or conductor 188 leads to a lever-type petcock 189 thence to a two-way valve 160 actuated by cam 158 carried on and rotated with shaft 100. Line 190 leads to the closed end of cylinder 139 and line 191 thence to a quick-dump valve 192 thence through line 193 to the rod end of the cylinder 139.

OPERATION OF THE CIRCUIT OF FIG. 8

With a length of tubing in the grip transfer arm assembly, the orifice discharge becomes blocked by this tubing so that flow in line 179 is blocked. With the valve 178 set in the phantom position, air flow through line 183 and 182 also ceases, causing valve 161 to be actuated to the position shown. Pressurized air supplied through line 185 is caused to flow to valve 171 and when a container is fed to the bail-forming apparatus an ear of the container engages and closes this valve so that air flows through line 172 to cylinder 170 to actuate the clutch. To deactivate the detection of a presence of a length of tubing in the cutoff and transfer mechanism, the switch 178 is snapped to the condition shown whereupon flow through line 183 is closed, causing valve 161 to move to the condition shown.

Pressurized air from line 188 is supplied to valve 160 which is actuated by the contour of cam 158 which determines the duration of air supplied to either line 190 or line 191. This, of course, determines the action of the cylinder 139 and the desired feeding of the tubing. The quick-dump valve 192 permits a rapid forward motion of the piston in the cylinder 139 without the necessity of returning the air in the rod end of the cylinder to valve 160 for disposition. Valve 189 permits the cylinder 139 to be shut down as to the operation of it and the feeding of tubing.

DESCRIPTION OF THE ALTERNATE TUBING CUTOFF AND TRANSFER APPARATUS OF FIGS. 9 AND 10

Referring next to the alternate embodiment of a tubing cutoff and transfer apparatus as shown in FIGS. 9 and 10, this embodiment includes a grip transfer arm 195 essentially identical to the transfer arm 50. This arm is pivotally carried on a shaft 196 by blocks 197 and 198. A cam follower bearing 199 is carried on shaft 200 which is mounted in the upper end of the arm 195. This follower bearing is retained between inner cam 80 and outer cam 81 on movable plate 83 in the manner of FIG. 2. A spring 201 is attached at its upper end to a tubing guide arm 202 pivotally carried on shaft 196. The other end of this spring 201 is attached to the upper end of a spring support 203 attached to the rear face of block 198. Spring 201 tends to rotate the arm 202 clockwise around shaft 196 but is limited in one extent by shaft 199 which engages a cutout formed in the upper part of the arm. The lower portion of the arm 202 is formed with a tube passageway 204 sized to pass and support the length of plastic tubing 110.

On the inside of each block 197 and 198 there is formed, as by milling, a shallow recess 205 which, as exemplified, is about one-quarter of an inch wide and of a depth just a few thousandths of an inch less than the gross thickness of an injector razor blade such as sold by the trade name Eversharp-Shick. In this recess is mounted such a blade 206 whose lower end is retained by a groove formed in each of a pair of lower bars 207 and 208 which is attached by cap screws 209 to the blocks 197 and 198. The upper ends of the blades 206 are retained in the groove by means of a retaining block 210 removably attached to the block by means of cap screw 211.

OPERATION OF ALTERNATE CUTOFF AND TRANSFER APPARATUS OF FIGS. 9 AND 10

This cutoff and transfer apparatus utilizes the sharp edge provided by injector razor blade to assist in the cutting of the tubing 110. This apparatus is arranged in the initial or tubing receiving position in FIG. 9. Cam follower bearing 199 is cammed forwardly by outer cam 81. Spring 201 urges guide arm 202 into engagement with shaft 200 to position tubing passageway 204 in alignment with the forward trough or guideway provided by upper and lower grip plates 62 and 63 carried by the lower extending tongue 58 of grip transfer arm 195. There is no cutoff knife 70 carried by arm 195 but, instead, tubing guide arm 202 which is moved clockwise by spring 201 is moved in synchronism with arm 195 through the limitation of the movable stop provided by shaft 200. An arcuate cutout 212 in block 198 permits tubing 110 to be swung forwardly by the downward movement of inner cam 80. As the tubing engages and passes by the sharp edge of injector blade 206, it is cut. The near blade adjacent arm 202 cuts or severs the tubing carried in the grip arm 195 from the longer length of tubing. The far blade 206 carried in block 197 may be used to trim the other end of the grip arm-retained length of tubing to the determined precise length. When, in its swinging movement, the front or left edge of arm 202 engages the movable plate 83, its forward movement is stopped. The grip arm 195, however, continues leftwardly with shaft 200 moving away from the arcuate recess in the upper portion of the arm 202 as the roller 199 proceeds to be moved up the box cam to the top of the cam trackway formed between inner and outer cam blocks 80 and 81. With the upward movement of the plate 83 the roller 199 is moved to the position shown in FIG. 9 with all parts of the cutoff and transfer mechanism assuming this shown condition and position to receive another length of tubing.

OPERATION OF TUBING CUTOFF AND TRANSFER MECHANISM OF FIGS. 1 AND 2

In all essentials the preferred embodiment of a tubing cutoff and transfer mechanism operates as does the alternate assembly of FIGS. 9 and 10 above-described. However, instead of cutting the tubing 110 with a blade, the forward movement of grip transfer arm 50 causes the tubing to be sheared between the inward end of cutoff bushing 68 and the arcuate cutout of cutoff knife 70. Instead of the tubing 110 being swung with tubing guide arm 202 as in FIG. 9 the tubing fed in FIG. 4–7 is retained in feeding tube elbow 153 and exits through the fixedly positioned cutoff bushing 68.

DESCRIPTION OF THE MECHANISM FOR PRODUCING HAND-ATTACHABLE BAILS WITH PLASTIC GRIPS

Referring next to FIGS. 11, 12, 13, 14 and 15 there is shown a wire bail-forming mechanism in which the ends of the bail are bent so that the bail may be hand-attached to eared containers. In FIG. 11 it is to be noted that a cut length of plastic tubing 225 has been mounted on a length of wire 226 in groove 227 in the same manner as above-described in conjunction with the automatic bail-forming apparatus. Upper die 228 has a cutout center portion in which is mounted a shaping block 230 which is contoured to shape the plastic handgrip portion provided by the cut length of tubing 225. The wire 226 forming the bail passes through the positioned tubing. Lower die 232 is also provided with a curved recess 233 formed so as to receive and retain the tubing and wire of the bail between block 230 and recess 233. Support points 234 and 235 are formed on lower die 232 adjacent each end of recess 233. These support points cause offsets to be formed in the bail which provide stops to position the handgrip on the bail. It is to be further noted that the lower die 232 has its lower portion curved inwardly at 237 and 238 so that the bail, as it is eventually formed and in a free state, will be curved inwardly. When mounted on an eared container the ends of the bail are sprung outwardly and with the bail in a free state the ends are biased toward the ears of the containers.

The ends of the bail of the hand-applied bails, exemplified, have a different configuration than do the ends of the bail provided for automatic mounting. The bails produced in the automatic bail-making and applying mechanism have their ends formed into loops lying in the plane of the bail. The ends of the bail which are to be hand-applied to the container have a portion turned inwardly at about right angles to the shank of the bail. The extreme ends, for a short length, are then bent at about right angles to the inwardly turned portions which lie in the plane of the bail.

This end-forming and bending is performed by means of in-bending blocks 239 and 240 which are fixedly mounted on main plate 241. These blocks further bend or form the wire around the lower extent of die 232. Rotatably mounted below blocks 239 and 240 are movable forming arms 242 and 243. These arms are moved toward or away from each other by means of gear segments 244 and 245 fixedly mounted on shafts 246 and 247 to which the arms are also fixedly mounted. Arm 248 is connected to shaft 246 and is preferably actuated by a drag link 250 actuated by means provided on the drive shaft of the bail-forming mechanism. A right angle forming block member 252 is pivotally carried in a bearing block 253 attached to the main plate 241. The operation and function of member 252 is more fully described hereinafter.

Figure 12:
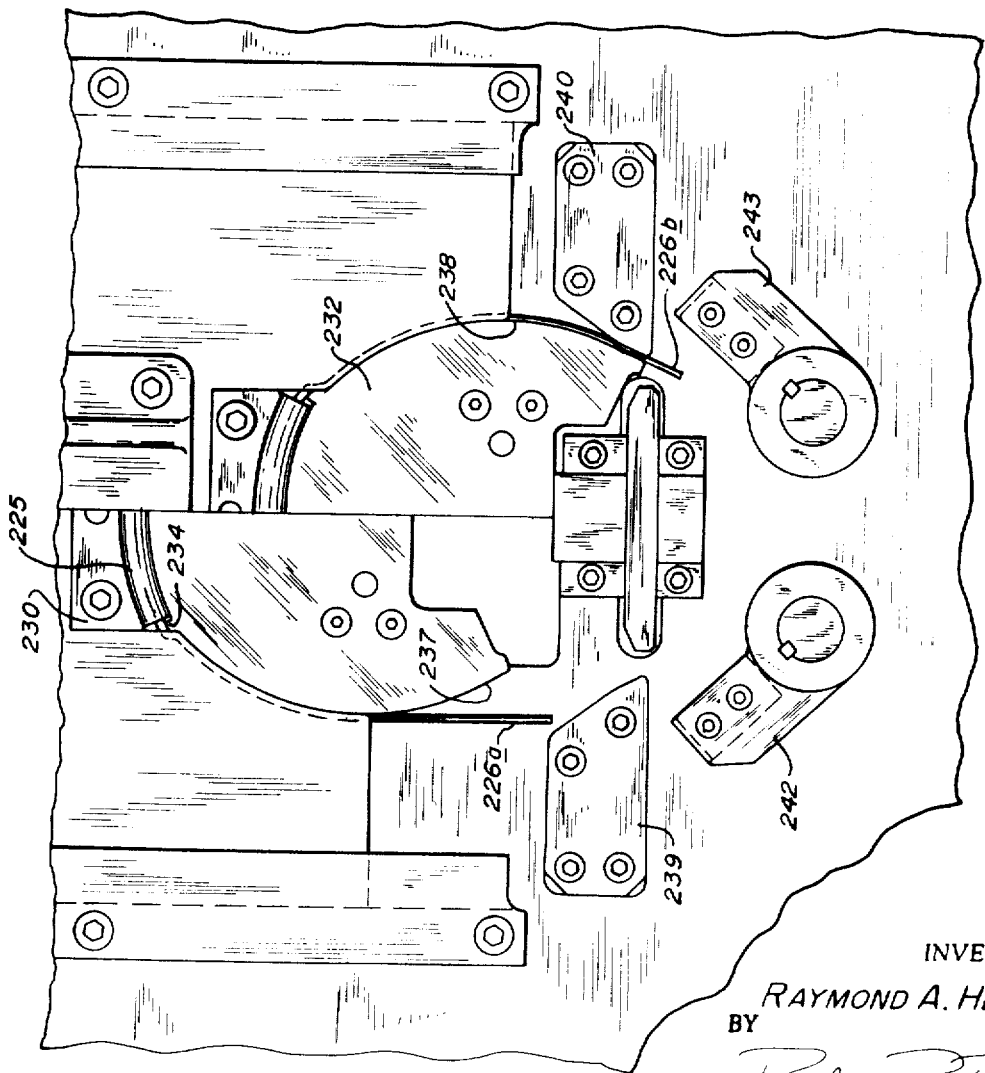
FIG. 12 represents in an enlarged view, partly fragmentary, the bail-making mechanism of FIG. 12 with the plastic grip handle mounted thereon and with the bail being shown in two stages of forming operation.

Referring next to FIG. 12, the upper portion view is divided to diagrammatically show the upper die 228 and lower die in two stages of operation. The left-hand view shows the upper die in a closed condition with the lower die and with the tubing 225 nested between block 230 and lower die recess 233. The protruding portion 234 on the lower die has caused the bail 226 to be offset from its side arc to form the retaining shoulder portion for the grip 225. It is to be noted that the downwardly extending portion 226a of the bail is approaching the inbending block 239 by which the bail is urged toward and to the side of the lower die portion 237.

Referring next to the right-hand side or portion of FIG. 12, it is to be seen that the upper and lower dies 228 and 232 have been moved downwardly to a condition wherein the end 226b of the bail 226 has approached and has engaged the inbending block 240. By its engagement this end 226b is bent inwardly toward and to die surface 238 and into a retained lower condition whereat the extending portion 226b of the bail is firmly retained between the left face of block 240 and the lower die portion 232.

Figure 13:
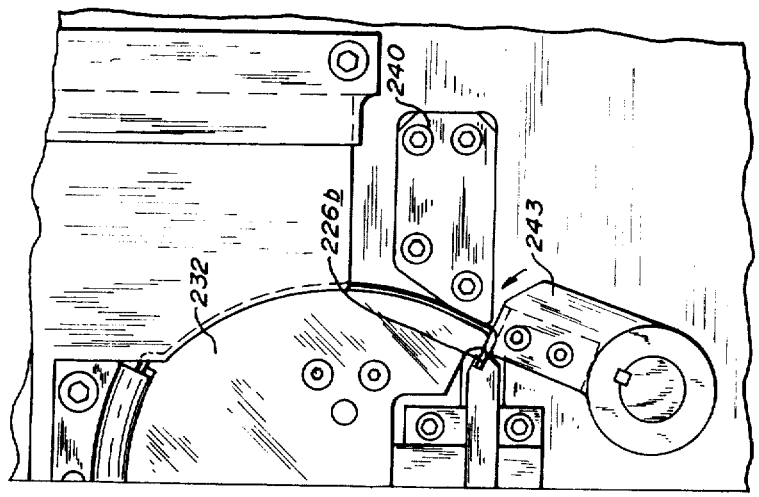
FIG. 13 represents the right-hand side view of FIG. 12 but with the mechanism at a further stage of end-forming operation and with the end of the bail now bent at right angles to the shank of the bail.

Referring next to FIG. 13, it is to be noted that the forming arm 243 has been rotated inwardly or counterclockwise to cause its upper end to engage the extending end 226b of the bail to cause this end to be bent inwardly in the plane of the bail and at substantially right angles to that portion of the bail which is trapped and retained between the block 240 and lower die 232. As seen in FIG. 11, the rotation of forming arms 242 and 243 is caused to be synchronized by means of gear segments 244 and 245. This movement of forming arms 242 and 243 is made in timed relationship to the bail-forming motion of the upper and lower dies.

With the bail in the held and formed position and condition as shown in FIG. 13, reference is now made to FIGS. 14 and 15 wherein is shown the means for the right angle bending of the tip ends of the bail as performed by forming block 252. In FIG. 14 the right angle forming block is shown as carried on a pivot pin 254 mounted in bearing block 253 and connected by arm 255 to a drag link 256 and as indicated by the arrow is moving towards the ends 226a and 226b of the bail 226. In FIG. 15 the arm 255 has been moved in the direction of the arrow which is the finishing position as seen in FIG. 15 whereupon ends 258 and 259 of the forming block have come in way of the tips 226a and 226b as retained by means of forming arms 242 and 243 and by these tips the ends 226c and 226d of the wire are bent generally to the degree shown.

Referring next to FIG. 16, there is shown an embodiment of the finished hand-bail with a plastic grip mounted thereon as made by the apparatus of FIGS. 11–15. The formed ends are identified as shown and described in the forming operations above. The sharply bent extreme ends of the wire are identified as 226c and 226d.

BAIL-ACCUMULATING AND TRANSFER APPARATUS

Referring next to FIG. 17, there is to be seen the face of a bail-forming mechanism such as that of FIGS. 11 through 15 but with an additional bail-accumulating and receiving apparatus mounted in place and in front of the upper and lower dies 228 and 232. Forming arms 242 and 243 have been rotated outwardly from holding engagement with the bail end. The finished bail of FIG. 16 is now to be discharged from the forming apparatus. An upper guide 260 has two rails disposed to slidably engage the upper portion of tubing 225. A lower guide 262 also is provided with two rails which are disposed to slidably retain and guide the lower portion of tubing 225. Extending rails 264, 265, 266 and 267 are disposed in four spaced positions below the tubing so as to engage and slidably guide the exposed wire portions of the bail. This lower portion of guide 262 and rails 264, 265, 266 and 267 are mounted on and carried by a support bracket 268.

Referring next to the diagrammatic face view as shown in FIG. 18, it is to be seen that midway of the plastic grip 225 there is provided a pusher pin 270 which has its end contoured to nest this plastic tubing grip therein. To the right and left and below pin 270 are pusher pins 272 and 273 which are positioned and sized to engage adjacent portions of the formed wire bail 226.

Referring next to FIG. 19 and the fragmentary partly side view of the bail-accumulating apparatus of FIG. 17, there is shown the relationship of the lower guide 262 and rail 267 and the grip pusher pin 270 and wire pusher pin 272. It is to be noted that the bail is retained by the pusher pins as it is moved outwardly.

Referring next to FIG. 20, there is shown partly in section, a side view of an exemplified means of transmitting timed motion to the pusher pins 270, 272 and 273. These pins are attached to a support plate 275, which plate is attached to a rack member 276. A gear segment 277 carried on support 278 is actuated by drag link 279 to move the pins 270, 272 and 273 outwardly from and back to the main plate 241.

Referring next to FIGS. 21, 22, 23 and 24, there is shown a latch mechanism which is provided on each of the rails 264, 265, 266 and 267. Through a slot in each rail (rail 266 being shown) there extends a clip end 280 or cam stop which is carried by a leaf spring 281 attached to the rail. This clip end is beveled or tapered at its outer end to provide a cam or ramp whose angle increases toward the rear. The clip is terminated to provide a shoulder at the rear or back end of the clip.

OPERATION OF THE BAIL LATCH APPARATUS

As pins 270, 272 and 273 are moved outwardly to transport a just-formed bail, the wire portions 226 of the bail are brought in way of the beveled or tapered surface of each of the clip ends 280. This is the action as represented by FIG. 22. As the bail wire 226 is moved further outwardly, it passes the inner or rear end of the clip end, whereupon the spring 281 moves the clip end toward and to the initial position against the rail. This action is represented by FIG. 24. As and when the pusher pins 270, 272 and 273 are returned to the bail-receiving position of FIG. 20, the bail wire 226 engages the rear or abutment edge of the clip end 280 and is stopped from any rearward movement, whereby the bail is removed from the pusher pins to remain in place on the bail-accumulating apparatus. As the bails are made and transferred, each new bail will push the adjacent previously formed bails outwardly on the rail portions. A counting, tieing and delivery mechanism, not shown, may be, and is, preferably used to automatically package the formed bails.

ALTERNATE PLASTIC TUBING FEEDING AND TRANSFER MECHANISM

Referring next to FIGS. 25 through 30, there is shown an alternate plastic tubing feeding mechanism which is disposed for use with a bail-making mechanism as above-described. Referring to FIG. 25, it is seen that a length of wire 285 has been fed in place in a wire groove 286 formed in main plate 287. Upper and lower dies 288 and 289 are contoured to receive a length of cut plastic tubing 290 which is shown as mounted on the wire. It is to be noted that the grip-forming portions of the upper and lower dies are contoured to provide a handle portion which is straight rather than curved, as in FIG. 11.

Referring next to FIGS. 26, 27 and 28, there is seen a grip transfer arm 295 which is similar to the grip transfer arm 50 above-described. Cam follower bearing 76 carried on arm 295 engages and is actuated by an inner cam 70 as above-described. A plastic tubing feeding elbow 296 is connected to a grip cutoff bushing 297 carried by and in mounting block 298. As seen in FIGS. 27 and 28, the grip arm 295 is disposed in its tubing receiving position in FIG. 27 and with the downward movement of inner cam 70 is moved in way of the infeeding wire bail 285 in FIG. 28.

TUBING FEEDING MECHANISM OF FIGS. 29 AND 30

Referring next to the tubing feeding mechanism of FIGS. 29 and 30, there is shown a pair of gears 300 and 301 which is of like pitch and in mounted condition is in mesh as it is carried in a frame or support 302. The intermediate portions of these gear teeth are contoured to form arcuate grooves 303 and 304 and with the gears in mesh the grooves mate so that a tubing 305 may be snugly engaged in the opposed toothed profiles. The rotation of one gear causes the other meshed gear to rotate with it and between them to grip and advance the tubing 305. In the providing of a grip on the bail it is desired that the tubing only be intermittently advanced so it is necessary that the rotation of the gears be rotated or turned in only one direction. Accordingly, as exemplified, shaft 307 which carries and positively rotates gear 300 by means of key 308 also carries ratchet 310 and also positively drives this ratchet by means of key 311.

On a hub 312 on gear 300 there is mounted a ball bearing 314 which rotatably retains gear 315. A pawl 316 is carried on a shoulder screw 317 mounted in a threaded hole 318 in gear 315. A spring, not shown, urges the pawl end into engagement with ratchet 310. A second pawl 319 which is contemplated to be identical to pawl 316 may be provided when it is desired to reduce the amount of lost motion of engagement. This second pawl 319 may be positioned slightly less than diametrically opposite the first pawl 316. A brake or other retaining means, not shown, tends to prevent shaft 307 from rotating. Cylinder 320 is adapted to reciprocably move rack 322 which is in mesh with gear 315. In the conventional manner of a one-way ratchet action, as rack 322 moves gear 315 clockwise, pawl 316 or 319 engages a tooth in the ratchet 310 to rotate the ratchet and shaft 307 a certain amount. Shaft 307, as it is rotated, also rotates gear 300 and meshed gear 301 to advance tubing 305. Reverse movement of rack 322 causes gear 315 to rotate counterclockwise, but braked shaft 307 does not turn as the engaged pawl or pawls are cammed out of engagement in the usual manner.

BAIL CONFIGURATIONS OF FIGS. 31, 32 AND 33

In FIG. 31 there is shown a bail 330 in which the handlegrip portion 331 is straight and the side portions are formed with straight portions 332 and 333. This configuration is produced by appropriate contouring of the upper and lower bail-forming dies and may be produced in either automatically attached or hand-attached bails.

In FIG. 32 there is shown a bail 335 which has its grip portion 336 offset. This grip is formed straight whereby in a mounted condition on an eared container 337 the grip portion is substantially parallel to the axis of the ears. The sides 338 of this bail are shown as arcuate.

In FIG. 33 there is shown a bail 340 which is similar to the bail of FIG. 32 but with the handgrip 341 curved and offset from the arcuate wire side members 342 of the bail.

In the above-described apparatus and mechanism, it is to be noted that in the tubing cutoff and transfer mechanism it is contemplated that a receiving path will be provided which will releasably grip the tubing. Whether cut with the use of injector blades or by shearing, the transfer of the tubing will be into the way of an advancing wire which is to be formed into a bail. All apparatus is contemplated as being convertible from bails provided with plastic grips to those without grips. The several feeding devices can be powered with air cylinders cycled from cam-controlled valves or from cams driving or actuating link arms.

In the above-described several embodiments which show means for the forming of wire bails with plastic grip portions it is contemplated that the wire is advanced by mechanism such as that shown in FIG. 3. This advancing mechanism is identified as 166 and is seen in the right side of this view. As exemplified, this wire-advancing mechanism is substantially identical to the wire-advancing mechanism fully described in my U.S. Pat. No. 3,241,578 more fully identified above. The advanced wire is cut by arm 166a also seen in FIG. 3 and fully shown and described in conjunction with FIGS. 11 and 12 of my said U.S. Pat. No. 3,241,578.

ALTERNATE TUBING CUTOFF AND TRANSFER MECHANISM AS SEEN IN FIGS. 34–37

In the production of hand bails, in particular, it has been found desirable to increase the production rate from 70 or so bails per minute which are formed for attachment to eared containers by bail-applying mechanism such as shown in FIG. 1, to a production rate of about 175 hand bails per minute. At this rate of production it has been found desirable to substantially modify the hand bail-forming mechanism of FIGS. 11–15 as shown and described above.

This high speed apparatus is seen in particular in FIGS. 34, 35 and 36. Fastened to the main plate 55 are support brackets 401 and 402 which are maintained in alignment by a support bar 404. In bracket 401 is mounted cutoff bushing 68 which is disposed to receive plastic tubing fed through the connected feeding tube elbow 153. Tubing receiving and transfer member 406 is formed with a cylindrical bore 408 which is open along all its forward side. This opening is about one-third the circumference of the bore and is made sufficiently wide so that when the resilient tubing is deflected or compressed while still on the wire the opening permits the bail wire and tube with the withdrawal motion of the transfer member 406 to be displaced from the bore 408.

Actuation of member 406 in this illustrated embodiment is provided by an air cylinder 410 whose piston rod 412 is attached to the member 406 near one end of said member. A slide guide 414 is adjustably aligned by means of slide screws 416 and 417 each of which is adjustably mounted in support bar 404. Guide 414 is attached to member 406 near the other end of this member. A stop finger or plate 420 is attached to and is cycled with the movement of member 406. The outer surface of finger 420 is disposed to slide by the inner end of cutoff bushing 68. The end of member 406 and the outer face of finger 420 are in a common plane so that as member 406 is cycled an inadvertent advance of the tubing does not create a jam with a movement of the end of the tubing past the rear portion of member 406.

Referring finally to the circuit diagram of FIG. 37 it is to be noted that from a supply means, not shown, a feed line 425 delivers pressurized air to a four-way valve 426. This valve is actuated by a cam 428 carried on crank shaft 100 of the bail-forming apparatus. Roller arm 430 of valve 426 is moved by cam 428 to cause air from the valve to be fed through line 432 to the rear of cylinder 410. This air input provides the forward stroke of the cylinder. The valve in its other position provides air input through line 434 to the rod end of the cylinder and provides the return stroke for member 408.

USE AND OPERATION OF THE CUTOFF AND TRANSFER APPARATUS OF FIGS. 34–37

With either the tubing feeding mechanism of FIG. 7 or FIG. 29 the plastic tubing is intermittently fed to and through elbow 153 and cutoff bushing 68 and into the bore 408 of transfer member 406. An aperture 436 formed in bracket 402 is disposed to accommodate any overrun of the fed tubing into and through bore 408. With the tubing advance completed, cam 428 moves roller 430 to actuate valve 426 to cause pressurized air to be fed through line 432 to cylinder 410. The resulting forward movement of rod 412 carries member 406 forwardly so that the tubing in bore 408 is cut by a shearing action as it is moved past the end of cutoff bushing 68 and also any tubing extending into aperture 436 is also sheared as member 406 is moved forwardly.

When member 406 reaches its forward travel limit the bore of the plastic tubing is aligned in the way of the advancing wire which is fed between the upper and lower dies 228 and 232 in the manner of FIG. 11. As soon as the wire has passed through the tubing, the rotating cam 428 actuates roller arm 430 to shift valve 426 so as to feed air to the cylinder 410 to move member 406 to the receiving condition of FIGS. 34 and 35.

As the member 406 begins its return stoke the wire restricts the rearward movement of the tube whereat the curved surface of bore 408 cams or deflects the tubing into the side opening provided in the longitudinal wall of the bore 408. This opening is sufficient to permit the tubing as mounted on the bail wire to be flattened and squeezed to permit the withdrawal of the bail and handle through the open side of the bore 408 of the transfer member 406. The rapid motion provided by this apparatus during its operation at 175 cycles per minute is possible because the member 406 is made light and compact. The cycle stroke of cylinder 410 is made as short as practical. The pivoting action of grip plates 62 and 63 and the impact stretching of the springs 64 is eliminated by providing the rigid retaining means of member 406 and the exit slot from bore 408. As reduced to practice, the bore in the plastic tubing is about twice the diameter of the wire providing the bail so that when the wire is about one-tenth of an inch in diameter the slot may be made about as wide as the tubing diameter less about a tenth of an inch. The spring and cam action used to provide the movement of the transfer arm as in FIG. 2, in this embodiment, has been succeeded by the use of a high speed pneumatic cylinder 410. A solenoid of course could be used in place of pneumatic cylinder 410 if desired.

The several embodiments above-shown and described have been developed and tested to provide high speed automatic production. It is contemplated that the several functions can be combined in several combinations to provide a particularly arranged bail-forming apparatus.

Terms such as "left," "right," "up," "down," "bottom," "top," "front," "back," "in," "out," "clockwise," "counter-clockwise" and the like are applicable to the embodiments shown and described in conjunction with the drawings. These terms are merely for the purposes of description and do not necessarily apply to the position in which the bail-forming, tubing feeding and cutting and transferring mechanisms may be constructed or used.

While a particular embodiment of the bail-forming, tubing feeding, cutoff and transferring mechanisms and alternate embodiments thereof have been shown and described it is to be understood the invention is not limited thereto since modifications may be made within the scope of the accompanying claims and protection is sought to the broadest extent the prior art allows.

What is claimed is:

1. An apparatus for applying plastic grips and the like to wire bail handles, said apparatus used in combination with a wire bail-forming mechanism adapted to receive, feed, cut and form wire so as to provide a wire bail for attachment to an eared container, said bail-forming and grip-applying apparatus including: (a) upper and lower dies on the bail-forming apparatus, said dies having their mid-portions contoured to receive and retain a determined length of plastic tubing of selected diameter as a length of wire inserted therethrough is being bent into a generally U-shaped bail; (b) a grip transfer arm mounted on the apparatus and at its initial tubing-receiving limit of movement disposed to receive an advancing end of a length of tubing and at its other tubing-delivering limit of movement to position the gripped tubing in way of an advancing wire used to make the bail handle; (c) means for moving the transfer arm to its limits of movement in timed relation to the wire feeding and cutting operation; (d) a tubing advance mechanism having a check mechanism disposed to engage the tubing so as to permit only a forward passage of the tubing and a movable gripping mechanism disposed to grip the tubing when moved in an advancing motion from a delivery start to a delivery completed position and to slide on the tubing when moved from the delivery completed to the delivery start position; (e) means for cutting the length of tubing advanced into the grip transfer arm from a longer length of tubing as the transfer arm is moved from its tubing receiving position to its tubing delivery position, and (f) a tubing retaining means provided on the grip transfer arm including a forward-extending tongue portion providing a thrust support substantially equal to the outer diameter of the tubing being used as a grip portion of the bail, said tongue having a C-shaped means for retaining and positioning the tubing as it is received and moved toward and to the dies of the bail-forming apparatus, the open side of the C-shaped retaining means adapted to permit the tubing to be drawn from the retaining means while the tubing is mounted on the wire of the bail.

2. An apparatus for applying plastic grips to wire bails as in claim 1 wherein the forwardly-extending tongue of the grip arm is of a thickness substantially equal to the outer diameter of the tubing, said tongue further having upper and lower grooves formed therein; and in which there is provided upper and lower grip plates adapted for mounting on the tongue, each grip plate having an inturned edge disposed to enter and be retained in one of said grooves, the outer edges of the plates being contoured longitudinally so that with the upper and lower plates positioned with their inturned edges in the grooves on the tongue these plates with the forward face of the tongue provide the C-shaped receiving means for the tubing, and in which there is provided means for resiliently retaining the plates on the tongue to permit the plates to be cammed from retaining engagement of the tube by the tube itself as the transfer arm is moved from its tubing delivery position to its tubing receiving position.

3. An apparatus for applying plastic grips to wire bails as in claim 2 in which there is provided a plurality of holes formed in a predetermined pattern in the tongue, each hole providing a passageway through the tongue and in which the means for resiliently retaining the plates on the tongue are tension springs carried in these holes in the tongue, and in which the ends of the tension springs extend through holes formed in the same predetermined pattern in at least one grip plate, and in which there is provided means for engaging and retaining the ends of the springs with at least one end being retained on the outside of at least one grip plate.

4. An apparatus for applying plastic grips to wire bails as in claim 1 in which the grip transfer arm is pivotally carried on a pair of support blocks, and in which there is provided at least one razor blade or the like carried by and mounted on a block so as to have its cutting edge in position to engage and cut the tubing carried by the grip transfer arm as it, the arm, is moved from its tubing receiving position to its tubing delivery position whereat the wire is fed through the tube.

5. An apparatus for applying plastic grips to wire bails as in claim 4 in which the grip transfer arm pivot means additionally carries a tubing guide arm in adjacent proximity, said tubing guide arm having a tube receiving passageway sized to receive and pass an infeeding length of tubing, and there is provided means for moving the tubing guide arm in synchronism with the transfer guide arm, whereby as said tubing guide arm is moved it is brought in way of and past the cutting edge of the razor blade.

6. An apparatus for applying plastic grips to wire bails as in claim 5 in which the extent of synchronized movement of the tubing guide arm is limited to a forward motion swing which is terminated when the guide arm movement approaches the path of the wire advance as the wire is moved in a determined path in the bail-forming mechanism.

7. An apparatus for applying plastic grips to wire bails as in claim 6 in which there is provided a pair of razor blades, each blade being carried on a support block, the blades being disposed and positioned to precisely cut tubing carried in the grip transfer arm ends to provide a precise predetermined length of tubing.

8. An apparatus for applying plastic grips to wire bails as in claim 1 in which there is provided means for forming the bail ends so as to be hand-attached to an eared container, said ends being formed with an intermediate short length of wire bent to extend inwardly at substantially right angles to the immediately adjacent shank portion of the bail and in the plane of the bail, and having a short distal end length bent at substantially right angles to the immediately connected intermediate short length of wire and to the plane of the bail.

9. An apparatus for applying plastic grips to wire bails as in claim 8 in which there is provided a bail ejecting, transporting and accumulating apparatus actuated in response to the forming action of the bail-making operation.

10. An apparatus for applying plastic grips to wire bails as in claim 9 in which there is provided a latch means disposed to engage a plurality of portions of the just-formed bail and disposed to provide means for stripping the bail from the ejecting mechanism as the mechanism is moved from bail-ejecting to the bail-forming condition.

11. An apparatus for applying plastic grips to wire bails as in claim 1 in which the grip transfer arm support and actuating means includes a fixed support and a pair of support blocks mounted thereon, a pivoted shaft carried by the blocks and disposed to retain the grip transfer arm in a pivoted manner on the shaft; a plate carried by the bail-forming apparatus and moved in response to the actuation of the bail-making apparatus; a cam carried by and on the plate and movable therewith, and a cam follower carried by the grip transfer arm and actuated by the cam carried by the plate so as to swing the grip transfer arm on the pivoted shaft and between determined limits.

12. An apparatus for applying plastic grips to wire bails as in claim 11 in which there is provided a tension spring attached at its one end to a fixed support carried by the bail-forming apparatus and at its other end is attached to the grip arm so as to move the grip arm to its tubing receiving position.

13. An apparatus for applying plastic grips to wire bails as in claim 1 in which the tubing advance mechanism includes a guide frame having a fixed block disposed to act with a pivoted cap member, the fixed block and cap member disposed to provide the check mechanism for permitting a one-way forward passage of the tubing, and in which there is a movable block carried in the guide frame and having a pivoted cam member, said movable block and pivoted cap disposed to provide the movable gripping mechanism and grasp the tubing when moved in an advancing motion and to slide on the tubing when moved in a returning motion.

14. An apparatus for applying plastic grips to wire bails as in claim 13 in which the movable block combination is moved by means of a pneumatic cylinder.

15. An apparatus for applying plastic grips to wire bails as in claim 13 in which the guide frame includes a pair of rails upon which the movable block is reciprocably carried by means of two pairs of rollers disposed to ride upon an inner surface of the rails and a like two pairs of rollers are disposed to ride upon the opposite outer side of the rails as the movable block is reciprocably cycled.

16. An apparatus for applying plastic grips to wire bails as in claim 1 in which the wire bail-forming dies are contoured so as to produce a bail wherein the handgrip portion is offset from the general configuration of the bail.

17. An apparatus for applying plastic grips to wire bails as in claim 1 in which wire bail-forming dies are contoured so as to produce a bail in which the hand-grip portion is a straight length and in mounted position on an eared container is in a plane substantially parallel to the ears of the container.

18. An apparatus for applying plastic grips to wire bails as in claim 1 in which the wire bail-forming dies are contoured so as to produce a bail in which the extent of wire portions between the handgrip and the ear engaging ends are two straight portions disposed at an angle to each other.

19. An apparatus for applying plastic grips to wire bails as in claim 1 wherein the grip transfer arm is a transfer member carried on guide means so as to be rapidly and reciprocably moved in a single plane, said transfer member having as its C-shaped tubing retaining means a cylindrical bore through the tongue portion, which bore is a sliding fit for the tubing providing the plastic grip, said cylindrical bore having an opening along all its forward side, said opening being about one-third circumference of the bore.

20. An apparatus for applying plastic grips to wire bails as in claim 19 in which the means for moving the transfer arm is a pneumatic cylinder whose piston rod acts as a portion of the guide means, and in which other portions of the guide means is a slide guide reciprocably retained in guide means provided in a support bracket attached to the bail-forming apparatus.

21. An apparatus for applying plastic grips to wire bails as in claim 20 in which the means for cutting the tubing includes a cutoff bushing carried in the support bracket and in which the transfer member carries a stop plate disposed to slid in front of and block any unwanted advancement of tubing during the time the transfer member is moved from its tubing-receiving position.

22. An apparatus for applying plastic grips to wire bails as in claim 21 in which the sidewall opening in the cylindrical bore through the tongue portion is of sufficient width to permit the tubing when squeezed toward the wire upon which it is mounted to cause the tubing to be flattened and drawn through said sidewall opening.

23. An apparatus for applying plastic grips to wire bails as in claim 1 in which there is provided tubing presence detection means communicating with the C-shaped tubing retaining means in the tongue so that in the absence of a length of tubing in the C-shaped retaining means the movement of the grip transfer arm is deactivated.

24. An apparatus for applying plastic grips and the like to wire bail handles, said apparatus used in combination with a wire bail-forming mechanism adapted to receive, feed, cut and form wire so as to provide a wire bail for attachment to an eared container, said bail-forming and grip-applying apparatus including: (a) upper and lower dies on the bail-forming apparatus, said dies having their mid-portions contoured to receive and retain a determined length of plastic tubing of selected diameter as a length of wire inserted therethrough is being bent into a generally U-shaped bail; (b) a grip transfer arm mounted on the apparatus and at its initial tube-receiving limit of movement disposed to receive an advancing end of a length of tubing and at its other, tube-delivering, limit of movement to position the gripped tubing in way of an advancing wire used to make the bail handle; (c) means for moving the transfer arm to its limits of movement in timed relation to the wire feeding and cutting operation; (d) a tubing advance mechanism having a pair of meshed gears each having a contoured groove formed in its toothed face and in meshed engagement the opposing grooves provide a tubing-gripping guide channel, said gears rotated by a one-way drive mechanism disposed to rotate one of the meshed gears in only one direction, said one-way drive mechanism having a positive stop means for preventing reverse rotation of the gears; (e) means for cutting the length of tubing advanced into the grip transfer arm from a longer length of tubing as the transfer arm is moved from its tubing receiving position to its tubing delivery position, and (f) a tubing retaining means provided on the grip transfer arm including a forward-extending tongue portion providing a thrust support substantially equal to the outer diameter of the tubing being used as a grip portion of the bail, said tongue having a C-shaped means for retaining and positioning the tubing as it is received and moved towards and to the dies of the bail-forming apparatus, the open side of the C-shaped retaining means adapted to permit the tubing to be drawn from the retaining means while the tubing is mounted on the wire of the bail.

25. An apparatus for applying plastic grips to wire bails as in claim 24 in which there is means for providing a determined amount of rotation to the meshed gears by a rack and gear mechanism actuated by a cylinder.

26. A method of providing a plastic tubing handgrip on a wire bail handle as the wire is advanced into a bail-forming and applying apparatus, the handgrip being cut from a longer length of tubing and transferred to a precise position in axial alignment with a substantially straight length of wire before the wire is bent into a generally U-shaped bail, the method including the steps of: (a) actuating a tubing advancing mechanism to supply a length of plastic tubing to and through a cutoff bushing; (b) feeding a determined length of tubing into a grip transfer arm assembly having a C-shaped passageway providing a grip retaining means and while said arm is in its tubing receiving position; (c) moving the grip arm to a tubing delivering and mounting position so that the tubing is brought in way of the path of an advancing length of wire, said tubing in its advance from said initial position being moved by the cutoff bushing so as to be severed at a determined length; (d) detecting the presence of a tubing length in the grip transfer arm so that an absence of a length of tubing prevents actuation of the feeding of the wire; (e) maintaining the grip transfer arm in the tube delivering position of movement while a wire in the bail-forming apparatus is fed through the cut tubing; (f) returning the grip transfer arm assembly to its tubing-receiving position while and as the bail-forming apparatus is actuated, and (g) forming the wire and mounted plastic tubing into a generally U-shaped bail.

27. A method of providing a plastic tubing handgrip on a wire bail handle as in claim 26 in which the moving of the grip arm includes the further steps of moving the C-shaped passageway into the path of the advancing length of wire so that the open side of the opening is opposite to the path of movement of the grip arm.

28. A method of providing a plastic tubing handgrip on a wire bail handle as in claim 26 in which the moving of the grip transfer arm assembly is by means of pneumatic cylinder moving the transfer arm in a determined plane.

29. A method of providing a plastic tubing handgrip on a wire bail handle as in claim 26 in which the actuating of tubing advancing mechanism includes the further steps of grasping the tubing in a one-way gripping mechanism and moving the gripping mechanism a determined distance to advance the tubing through a one-way check mechanism.

30. A method of providing a plastic tubing handgrip on a wire as in claim 29 in which there is provided the further step of bringing a stop member in way of the advancing tubing during the period of time the grip transfer arm is moved from tubing receiving position.

* * * * *